United States Patent
Fujita et al.

(10) Patent No.: US 11,124,163 B2
(45) Date of Patent: Sep. 21, 2021

(54) METHOD FOR CONTROLLING TRAVEL OF VEHICLE, AND DEVICE FOR CONTROLLING TRAVEL OF VEHICLE

(71) Applicant: Nissan Motor Co., Ltd., Yokohama (JP)

(72) Inventors: Susumu Fujita, Kanagawa (JP); Motonobu Aoki, Kanagawa (JP); Yohei Mishina, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 424 days.

(21) Appl. No.: 16/072,263

(22) PCT Filed: Jan. 4, 2017

(86) PCT No.: PCT/JP2017/000052
§ 371 (c)(1),
(2) Date: Jul. 24, 2018

(87) PCT Pub. No.: WO2017/130643
PCT Pub. Date: Aug. 3, 2017

(65) Prior Publication Data
US 2019/0023239 A1    Jan. 24, 2019

(30) Foreign Application Priority Data
Jan. 29, 2016  (JP) .............................. JP2016-015817

(51) Int. Cl.
*B60T 7/12*    (2006.01)
*B60W 30/09*   (2012.01)
(Continued)

(52) U.S. Cl.
CPC ................ *B60T 7/12* (2013.01); *B60R 21/34* (2013.01); *B60W 30/09* (2013.01); *B60W 40/04* (2013.01);
(Continued)

(58) Field of Classification Search
CPC ........ B60T 7/12; B60T 7/22; B60T 2201/022; B60T 7/18; B60T 8/171; B60W 30/09;
(Continued)

(56) References Cited

U.S. PATENT DOCUMENTS 6,337,637 B1 *  1/2002  Kubota ..................... B60T 7/18
                                                   180/271
8,019,537 B2 *  9/2011  DeVries ............. G01C 21/3626
                                                   701/426
(Continued)

FOREIGN PATENT DOCUMENTS

JP     2004185363 A     7/2004
JP     2009271766 A     11/2009
(Continued)

*Primary Examiner* — Luis A Martinez Borrero
(74) *Attorney, Agent, or Firm* — Young Basile Hanlon & MacFarlane, P.C.

(57) ABSTRACT

A pedestrian crosswalk through which a subject vehicle is expected to pass is specified as a target pedestrian crosswalk. Road configurations close to the target pedestrian crosswalk are detected. Traffic lines of moving objects crossing the target pedestrian crosswalk are estimated on the basis of the road configurations. An area including the estimated traffic lines is set as a detection area of a detector detecting objects around the subject vehicle. The moving objects are detected by the detector in the detection area. Travel of the subject vehicle is controlled on the basis of a detection result of the detector.

9 Claims, 18 Drawing Sheets

(51) Int. Cl.
*G08G 1/16* (2006.01)
*B60R 21/34* (2011.01)
*B60W 40/04* (2006.01)
*G01S 13/86* (2006.01)
*G01S 13/93* (2020.01)
*B60T 8/171* (2006.01)
*B60T 8/172* (2006.01)
*B60W 30/095* (2012.01)

(52) U.S. Cl.
CPC ............ *G01S 13/867* (2013.01); *G01S 13/93* (2013.01); *G08G 1/16* (2013.01); *B60T 8/171* (2013.01); *B60T 8/172* (2013.01); *B60T 2201/03* (2013.01); *B60T 2250/04* (2013.01); *B60W 30/0956* (2013.01); *B60W 2554/00* (2020.02); *B60W 2555/60* (2020.02); *B60W 2556/50* (2020.02); *B60W 2720/10* (2013.01)

(58) Field of Classification Search
CPC ......... B60W 30/0956; B60W 2554/00; B60W 30/0953; B60W 40/02; B60W 10/06; B60W 10/20; G01S 13/93; G01S 13/86; G01S 13/867; G08G 1/16; G08G 1/005; G08G 1/166; G08G 1/0112; B60R 21/34; G05D 2201/0213; G05D 1/0088; G05D 1/0214; G05D 1/0246
See application file for complete search history.

(56) References Cited

U.S. PATENT DOCUMENTS

| | | | | |
|---|---|---|---|---|
| 8,195,394 B1 * | 6/2012 | Zhu | ........................ | G01C 21/26 701/514 |
| 8,666,651 B2 * | 3/2014 | Kumabe | ................ | G08G 1/164 701/301 |
| 8,718,861 B1 * | 5/2014 | Montemerlo | ....... | B60W 50/082 701/26 |
| 8,903,640 B2 * | 12/2014 | Caminiti | .............. | G08G 1/0104 701/301 |
| 9,290,178 B2 * | 3/2016 | Sakima | ............... | B60W 30/095 |
| 9,436,877 B2 * | 9/2016 | Edmondson | ....... | G06K 9/00765 |
| 9,460,627 B2 * | 10/2016 | Minemura | ............. | G08G 1/166 |
| 9,551,992 B1 * | 1/2017 | Barton-Sweeney | ......................... | G06Q 10/047 |
| 9,637,118 B2 * | 5/2017 | Yokota | .................... | G06T 7/251 |
| 9,718,405 B1 * | 8/2017 | Englander | ................ | B60R 1/00 |
| 9,740,202 B2 * | 8/2017 | Barton-Sweeney | ......................... | B60W 30/0956 |
| 9,792,821 B1 * | 10/2017 | Yalla | ................. | G01C 21/3602 |
| 10,002,536 B2 * | 6/2018 | Kim | .................... | G08G 1/0962 |
| 10,239,539 B2 * | 3/2019 | Aoki | ................ | B60W 50/0097 |
| 10,384,679 B2 * | 8/2019 | Fujita | ................. | G01C 21/3667 |
| 10,387,733 B2 * | 8/2019 | Yokota | .................... | G06T 7/277 |
| 10,576,945 B2 * | 3/2020 | Sung | ..................... | G01S 13/589 |
| 10,705,530 B2 * | 7/2020 | Aoki | ...................... | G08G 1/166 |
| 10,717,434 B2 * | 7/2020 | You | ................. | B60W 30/18109 |
| 10,795,804 B1 * | 10/2020 | Nygaard | ............. | G06F 11/3696 |
| 2005/0201590 A1 * | 9/2005 | Kudo | ..................... | G08G 1/167 382/103 |
| 2010/0061591 A1 * | 3/2010 | Okada | ................... | G08G 1/166 382/103 |
| 2011/0161002 A1 * | 6/2011 | DeVries | ............. | G01C 21/3626 701/426 |
| 2012/0161951 A1 * | 6/2012 | Ito | .......................... | B60Q 9/008 340/435 |
| 2012/0182140 A1 * | 7/2012 | Kumabe | ................ | G08G 1/161 340/435 |
| 2012/0185160 A1 * | 7/2012 | Kumabe | ................ | G08G 1/164 701/301 |
| 2013/0013184 A1 * | 1/2013 | Morotomi | .............. | G08G 1/166 701/301 |
| 2014/0324330 A1 * | 10/2014 | Minemura | ............... | G08G 1/16 701/301 |
| 2015/0035685 A1 * | 2/2015 | Strickland | .............. | B60Q 1/525 340/901 |
| 2015/0084791 A1 * | 3/2015 | Jang | ......................... | G08G 1/07 340/944 |
| 2015/0219761 A1 | 8/2015 | Inomata | | |
| 2015/0334269 A1 * | 11/2015 | Yokota | ................ | B60W 30/143 382/103 |
| 2016/0003636 A1 * | 1/2016 | Ng-Thow-Hing | ..... | G08G 1/167 701/26 |
| 2017/0018187 A1 * | 1/2017 | Kim | ........................ | G08G 1/166 |
| 2017/0185853 A1 * | 6/2017 | Yokota | ................... | G06T 11/60 |
| 2017/0199523 A1 * | 7/2017 | Barton-Sweeney | ......................... | B60W 60/0011 |
| 2017/0278402 A1 * | 9/2017 | Yalla | .................... | G01C 21/3602 |
| 2019/0016316 A1 * | 1/2019 | Sung | ..................... | G08G 1/165 |
| 2019/0031198 A1 * | 1/2019 | Aoki | ................. | B60W 30/0956 |
| 2019/0033876 A1 * | 1/2019 | Aoki | ................. | B60W 30/0956 |

FOREIGN PATENT DOCUMENTS

| | | |
|---|---|---|
| JP | 2011070384 A | 4/2011 |
| JP | 2011257984 A | 12/2011 |
| JP | 2012160166 A | 8/2012 |
| JP | 201493040 A | 5/2014 |
| JP | 2014219814 A | 11/2014 |

\* cited by examiner

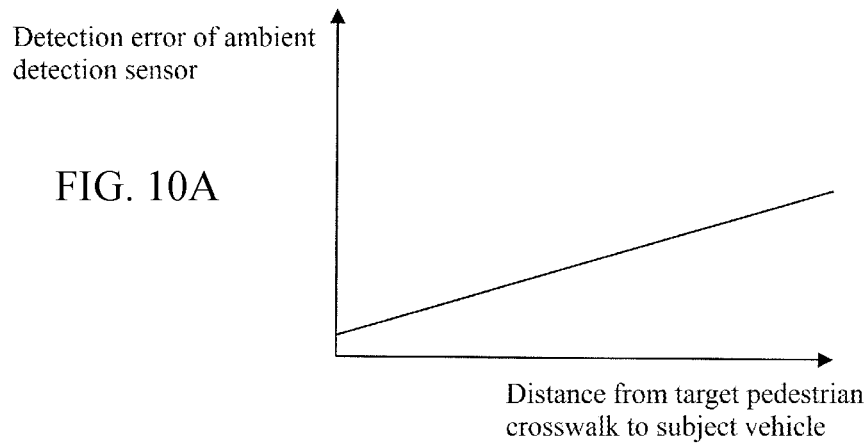
FIG. 10A
Detection error of ambient detection sensor
Distance from target pedestrian crosswalk to subject vehicle
FIG. 10B
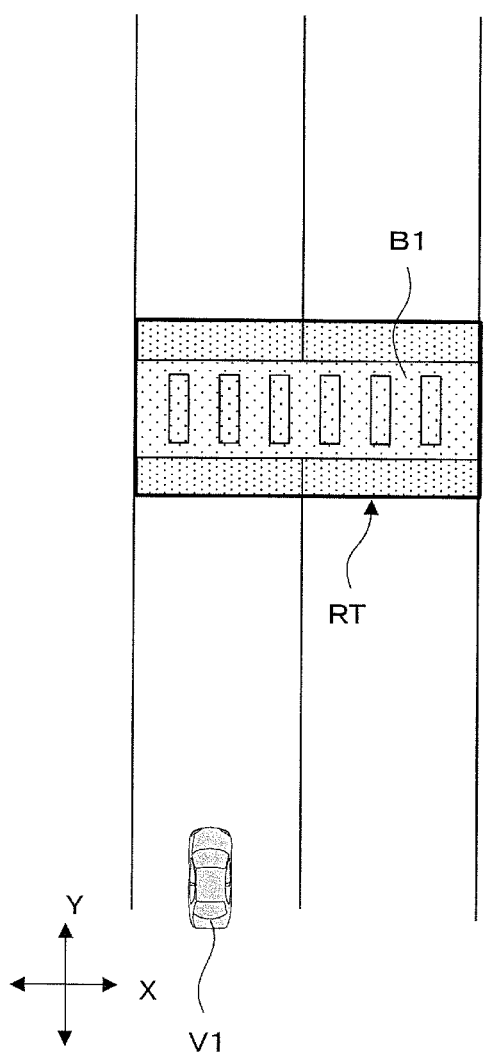
FIG. 10C
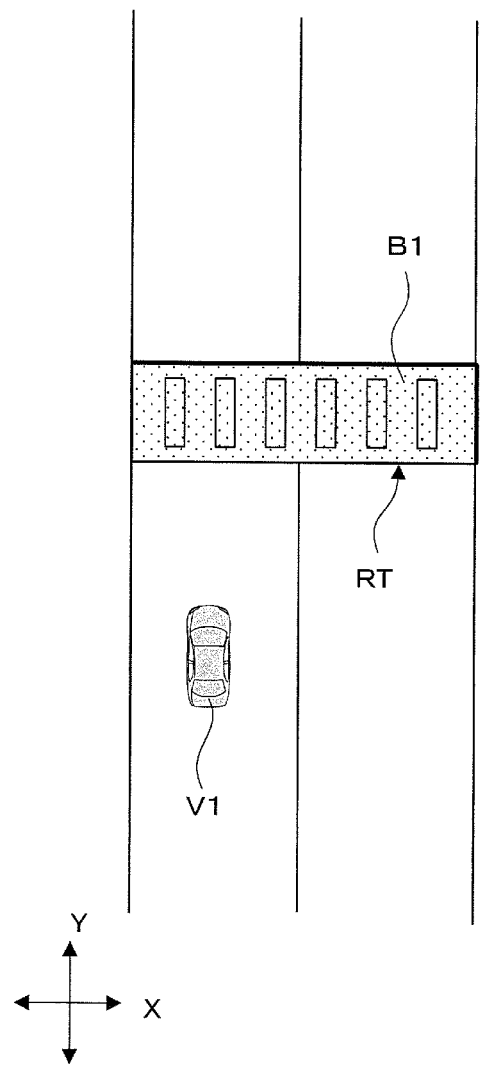

METHOD FOR CONTROLLING TRAVEL OF VEHICLE, AND DEVICE FOR CONTROLLING TRAVEL OF VEHICLE

CROSS-REFERENCE TO RELATED APPLICATIONS

The present application claims priority to Japanese Patent Application No. 2016-015817 filed Jan. 29, 2016, the entire content of which is herein incorporated by reference.

TECHNICAL FIELD

The present invention relates to a travel control method for a vehicle and a travel control apparatus for a vehicle.

BACKGROUND

Heretofore known in the art is a technique of detecting a moving object existing around a subject vehicle and determining whether or not the detected moving object and the subject vehicle come close to each other at a pedestrian crosswalk (e.g. JP2014-93040A).

In the prior art, unfortunately, even for a moving object that is far from a pedestrian crosswalk and thus less likely to cross the pedestrian crosswalk, a determination is made whether or not the moving object comes close to the subject vehicle at the pedestrian crosswalk. This may be problematic.

SUMMARY

A problem to be solved by the present invention is to provide a travel control method for a vehicle and a travel control apparatus for a vehicle with which, when the subject vehicle approaches a pedestrian crosswalk, a moving object that may come close to the subject vehicle can be appropriately detected.

The present invention solves the above problem through specifying a pedestrian crosswalk through which a subject vehicle is expected to pass as a target pedestrian crosswalk, detecting a road configuration close to the target pedestrian crosswalk, estimating a traffic line of a moving object crossing the target pedestrian crosswalk on the basis of the road configuration, setting an area including the estimated traffic line as a detection area, and detecting the moving object in the detection area.

According to the present invention, the detection area is set on the basis of the traffic line of the moving object crossing the target pedestrian crosswalk. When the subject vehicle approaches the target pedestrian crosswalk, therefore, a moving object that may come close to the subject vehicle can be appropriately detected.

BRIEF DESCRIPTION OF THE DRAWINGS

FIGS. 10A, 10B and 10C are a set of diagrams for describing an example of the relationship between the distance to a target pedestrian crosswalk and the detection area;

DETAILED DESCRIPTION

Hereinafter, one or more embodiments of the present invention will be described with reference to the drawings. In the embodiments, a travel control apparatus for a vehicle equipped in the vehicle will be exemplified and described.

First Embodiment

Figure 1:
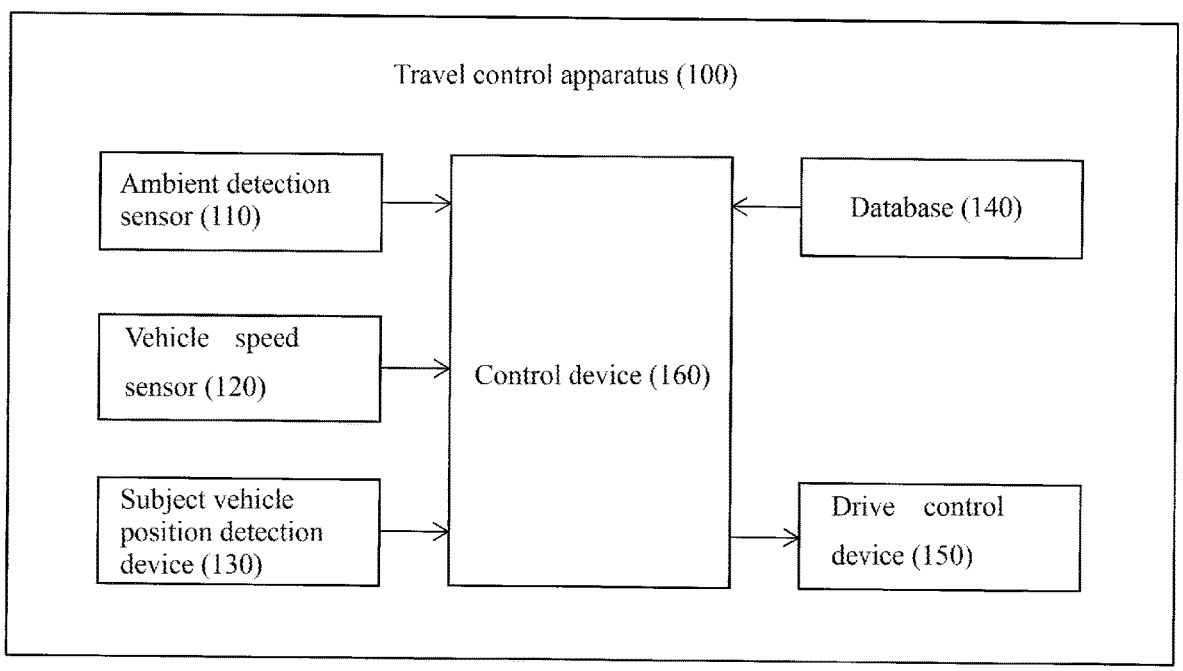
FIG. 1 is a block diagram illustrating a travel control apparatus for a vehicle according to one or more embodiments of the present invention.

FIG. 1 is a block diagram illustrating the configuration of a travel control apparatus 100 for a vehicle according to an embodiment of the present invention. As illustrated in FIG. 1, the travel control apparatus 100 for a vehicle according to the present embodiment includes an ambient detection sensor 110, a vehicle speed sensor 120, a subject vehicle position detection device 130, a database 140, a drive control device 150, and a control device 160. These devices are connected to one another via a controller area network (CAN) or other in-vehicle LAN for mutually exchanging information.

The ambient detection sensor 110 detects objects existing around the subject vehicle. Examples of such an ambient detection sensor 110 include a front camera that captures images ahead of the subject vehicle, a rear camera that captures images behind the subject vehicle, a front radar that detect obstacles ahead of the subject vehicle, a rear radar that detects obstacles behind the subject vehicle, and side radars that detect obstacles existing on the sides of the subject vehicle. Examples of the objects detected by the ambient detection sensor 110 include pedestrians, bicycles, motorbikes, cars, obstacles on a road, traffic signals, road surface signs, and pedestrian crosswalks. The ambient detection sensor 110 may be configured using one sensor of the above-described sensors or may also be configured using a combination of two or more sensors. The detection results of the ambient detection sensor 110 are output to the control device 160.

The vehicle speed sensor 120 measures the rotational speed of a drive system such as a drive shaft or a wheel and detects the traveling speed of the vehicle (also referred to as a "vehicle speed," hereinafter) on the basis of the measured rotational speed. The vehicle speed information detected by the vehicle speed sensor 120 is output to the control device 160.

The subject vehicle position detection device 130 is composed of a GPS unit, a gyro-sensor, and other necessary components. The subject vehicle position detection device 130 detects radio waves transmitted from a plurality of communication satellites using the GPS unit to periodically acquire positional information of the subject vehicle and detects the current position of the subject vehicle on the basis of the acquired positional information of the subject vehicle, angle variation information acquired from the gyro-sensor, and the vehicle speed acquired from the vehicle speed sensor 120. The positional information of the subject vehicle detected by the subject vehicle position detection device 130 is output to the control device 160.

Figure 2:
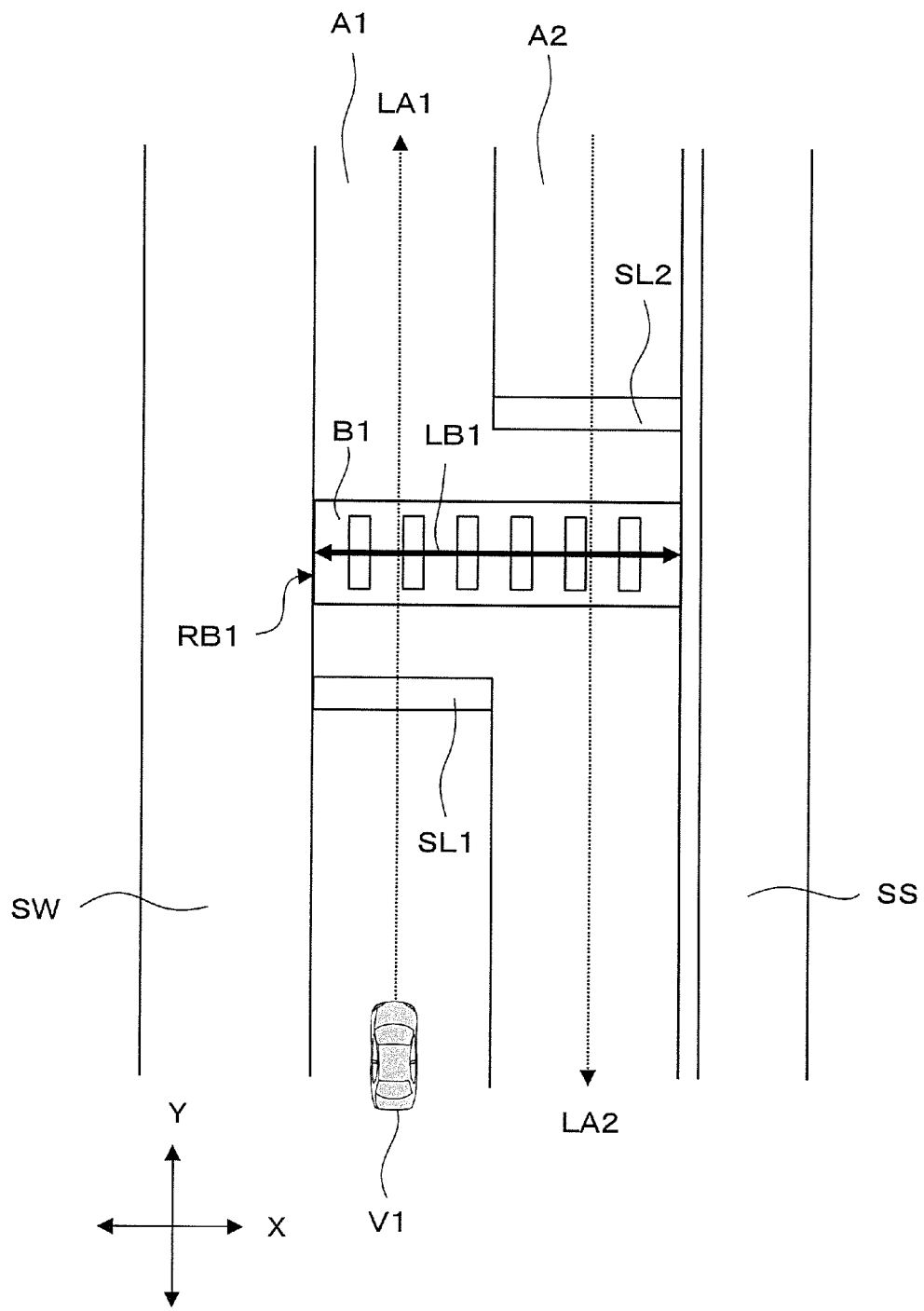
FIG. 2 is a diagram illustrating an example of link information and area information of a pedestrian crosswalk that are possessed by map information.

The database 140 stores map information. The map information includes link information of each of a road on which the vehicle travels, a sidewalk, and a pedestrian crosswalk. FIG. 2 is a diagram for describing the link information of the map information. The link information of a road on which the vehicle travels has one or more links and one or more nodes of each lane as the link information. For example, in the example illustrated in FIG. 2, each of links LA1 and LA2 of lanes A1 and A2 is stored in the database 140 as the link information of a road on which the subject vehicle V1 travels. The link information of each pedestrian crosswalk has one or more links extending in the length direction of the pedestrian crosswalk (i.e. crossing direction of a moving object such as a pedestrian or a bicycle crossing the pedestrian crosswalk) as the link information. For example, in the example illustrated in FIG. 2, a link LB1 of a pedestrian crosswalk B1 is stored in the database 140 as the link information of the pedestrian crosswalk.

The map information stored in the database 140 also includes area information of pedestrian crosswalks on the map. The shape of the area of a pedestrian crosswalk is not limited to a rectangular shape and may also be other polygonal shape. For example, in the example illustrated in FIG. 2, area information such as the position and shape of an area RB1 occupied by the pedestrian crosswalk B1 on the map is stored in the database 140. The map information stored in the database 140 also includes information on road configurations other than pedestrian crosswalks. Examples of such information on road configurations include information on sidewalks, roadside strips, and median strips. For example, in the example illustrated in FIG. 2, a sidewalk SW and a roadside strip SS are stored in the database 140 as the information on the road configurations. In addition, the database 140 has information on lane boundary lines (such as lane marks and curbstones), stop lines, guardrails, road shapes, road curvatures, etc. as the map information. The map information stored in the database 140 is appropriately referred to by the control device 160.

The drive control device 150 controls travel of the subject vehicle. For example, when the subject vehicle is controlled to follow a preceding vehicle (this control will be referred to as "follow-up travel control," hereinafter), the drive control device 150 controls the operation of a drive mechanism (which includes the operation of an internal-combustion engine in the case of an engine car and the operation of an electric motor in the case of an electric car or the like and further includes the torque distribution for an internal-combustion engine and an electric motor in the case of a hybrid car) and the braking operation to achieve the acceleration, deceleration and vehicle speed so that the distance between the subject vehicle and the preceding vehicle can be maintained at a constant distance. When the subject vehicle performs right or left turn, lane change, or the like, the drive control device 150 controls the operation of a steering actuator to control the operation of wheels and thereby executes the steering control of the subject vehicle. The drive control device 150 controls travel of the subject vehicle in accordance with commands sent from the control device 160, which will be described below. Other well-known methods can also be used as a travel control method by the drive control device 150.

The control device 160 is composed of a read only memory (ROM) that stores programs for controlling travel of the subject vehicle, a central processing unit (CPU) that executes the programs stored in the ROM, and a random access memory (RAM) that serves as an accessible storage device. As substitute for or in addition to the CPU, a micro processing unit (MPU), digital signal processor (DSP), application specific integrated circuit (ASIC), field programmable gate array (FPGA), or the like can also be used as an operating circuit.

The control device 160 executes the programs stored in the ROM using the CPU thereby to achieve the following various functions: a subject vehicle information acquisition function of acquiring information on the subject vehicle; an ambient information acquisition function of acquiring the detection results of the ambient detection sensor 110; a route search function of searching for a planned travel route of the subject vehicle; a pedestrian crosswalk specifying function of specifying a pedestrian crosswalk through which the subject vehicle is expected to pass as a target pedestrian crosswalk; a road configuration detection function of detecting road configurations close to the target pedestrian crosswalk; a traffic line estimation function of estimating the traffic line of a moving object on the basis of the detected road configurations; a detection area setting function of setting a detection area on the basis of the traffic line of a moving object; a moving object detection function of detecting a moving object in the detection area; and a travel control function of controlling travel of the subject vehicle on the basis of the detection result of the moving object. These functions of the control device 160 will be described below.

The subject vehicle information acquisition function of the control device 160 is a function capable of acquiring information regarding the subject vehicle as the subject vehicle information. Specifically, the control device 160 can use the subject vehicle information acquisition function to acquire the vehicle speed information of the subject vehicle from the vehicle speed sensor 120 as the subject vehicle information. In addition or alternatively, the control device 160 can use the subject vehicle information acquisition function to acquire information on the current position of the subject vehicle from the subject vehicle position detection device 130 as the subject vehicle information.

The ambient information acquisition function of the control device 160 is a function capable of acquiring the detection results of the ambient detection sensor 110 as the ambient information. For example, the control device 160 can use the ambient information acquisition function to acquire the image information outside the vehicle captured by the front camera and the rear camera and/or the detection results by the front radar, rear radar, and side radars as the ambient information. In addition or alternatively, the control device 160 can use the ambient information acquisition function to perform image analysis on the image information acquired from the cameras and/or perform a clustering process on the point cloud information detected by the radars, thereby acquiring information on the position and/or moving speed of an object existing around the subject vehicle, etc., as the ambient information.

The route search function of the control device 160 is a function capable of searching for a planned travel route of the subject vehicle. For example, when the driver inputs a destination via an input device (not illustrated), the control device 160 can use the route search function to search for a planned travel route of the subject vehicle on the basis of the destination input by the driver, the map information stored in the database 140, and the positional information of the subject vehicle detected by the subject vehicle position detection device 130. The database 140 according to the present embodiment stores the link information of each lane, as illustrated in FIG. 2. The link or links of each lane are preliminarily weighted in accordance with the travel distance, road situation, etc. of the lane (for example, the weighting of links increases as the distance increases or the road situation deteriorates). The control device 160 can use the route search function to specify a lane that is suitable for the travel route from the current position of the subject vehicle to the destination, for example, and correct the weighting of links of the specified lane. For example, when right turn is required to arrive at the destination, the weighting of links of the lane for right turn can be corrected to decrease. Then, the control device 160 can use the route search function to search for a planned travel route that is a route at a lane level in which the total sum of weighting of links is minimum in the lane from the current position of the subject vehicle to the destination, using a graph search algorithm such as Dijkstra's algorithm or A* (A-star) algorithm.

The pedestrian crosswalk specifying function of the control device 160 is a function capable of specifying a pedestrian crosswalk through which the subject vehicle is expected to pass as a target pedestrian crosswalk on the basis of the planned travel route searched by the route search function and the map information stored in the database 140. For example, the control device 160 can use the pedestrian crosswalk specifying function to refer to the map information stored in the database 140, thereby acquiring the area information of a pedestrian crosswalk represented by a polygonal shape. Then, when the link of a lane representing the planned travel route of the subject vehicle intersects with the area of a pedestrian crosswalk, the control device 160 can specify the pedestrian crosswalk as a target pedestrian crosswalk using the pedestrian crosswalk specifying function. For example, in the example illustrate in FIG. 2, the link LA1 of the lane A1 representing the planned travel route of the subject vehicle intersects with the area RB1 of the pedestrian crosswalk B1, and the pedestrian crosswalk B1 is therefore specified as the target pedestrian crosswalk.

The method of specifying the target pedestrian crosswalk is not limited to the above method. For example, when the link of a lane determined as the planned travel route of the subject vehicle intersects with the link of a pedestrian crosswalk, the control device 160 can specify the pedestrian crosswalk as a target pedestrian crosswalk using the pedestrian crosswalk specifying function. In the example illustrate in FIG. 2, the link LA1 of the lane A1 representing the planned travel route of the subject vehicle intersects with the link LB1 of the pedestrian crosswalk B1, and the control device 160 can therefore specify the pedestrian crosswalk B1 as the target pedestrian crosswalk using the pedestrian crosswalk specifying function. In addition or alternatively, the control device 160 may be configured to use the pedestrian crosswalk specifying function to acquire an image captured ahead of the subject vehicle from the camera, which captures images ahead of the subject vehicle V1, and perform image analysis thereby to specify the target pedestrian crosswalk.

The road configuration detection function of the control device 160 is a function capable of detecting road configurations close to the target pedestrian crosswalk, such as sidewalks, roadside strips, pedestrian crosswalks, and median strips, from the detection results of the ambient detection sensor 110 or the map information acquired from the database 140. For example, in the example illustrated in FIG. 2, the control device 160 can use the road configuration detection function to detect the sidewalk SW and roadside strip SS close to the target pedestrian crosswalk B1 as the road configurations close to the target pedestrian crosswalk.

Figure 3:
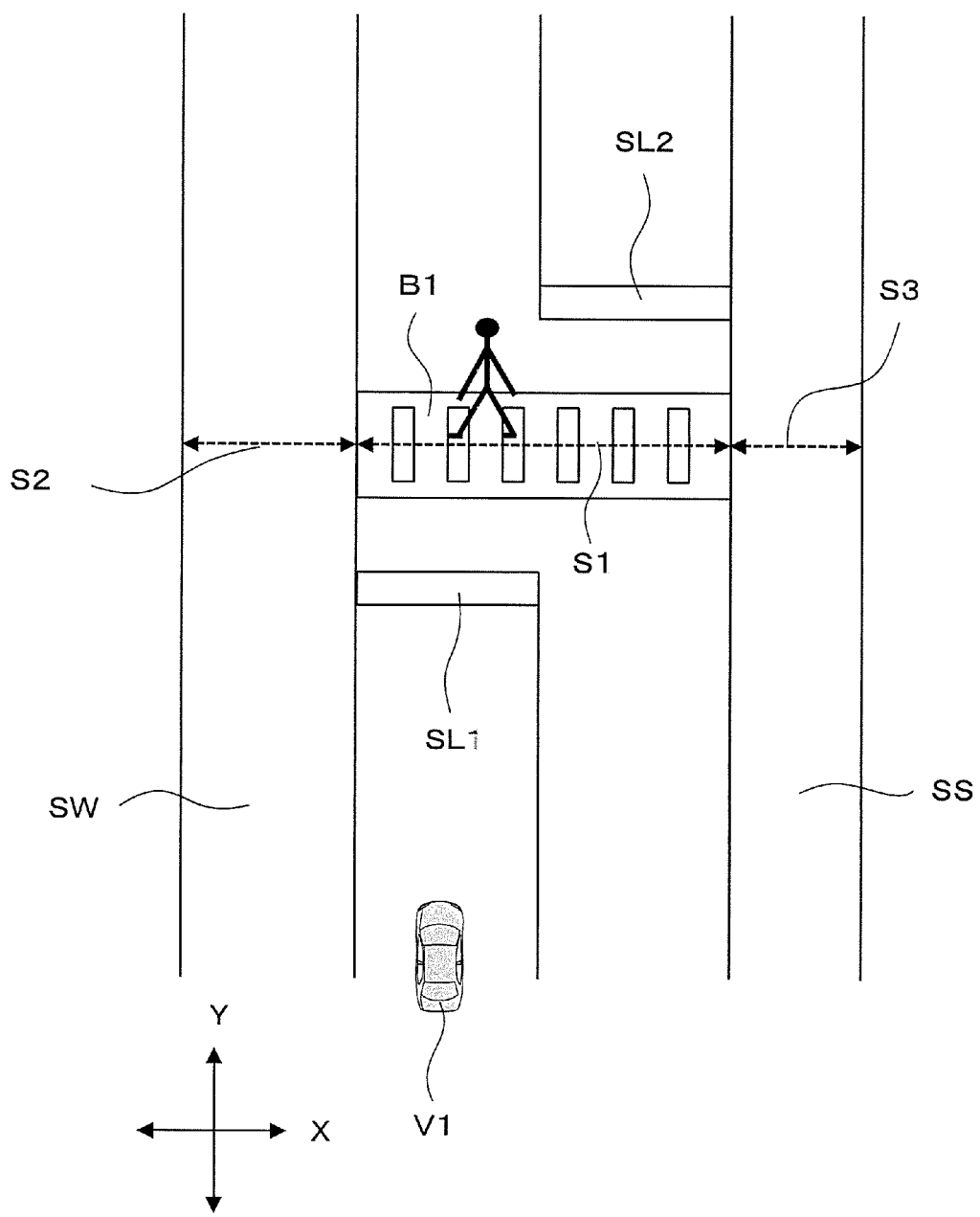
FIG. 3 is a diagram illustrating an example of a traffic line of a moving object crossing a pedestrian crosswalk.

The traffic line estimation function of the control device 160 is a function of capable of estimating, in the target pedestrian crosswalk, a traffic line (which refers to a line representing the direction/frequency of movement of a person or an object) of a moving object (moving body crossing a pedestrian crosswalk, such as a pedestrian or a bicycle) crossing the target pedestrian crosswalk, on the basis of the road configurations detected using the road configuration detection function. In the present embodiment, as illustrated in FIG. 3, the control device 160 can use the traffic line estimation function to estimate that a moving object crosses the target pedestrian crosswalk and estimate a traffic line S1 of the moving object on the target pedestrian crosswalk.

In addition or alternatively, the control device 160 can use the traffic line estimation function to estimate, in a sidewalk or a roadside strip, the traffic line of a moving object waiting at the sidewalk or roadside strip for crossing the target pedestrian crosswalk, on the basis of the road configurations detected using the road configuration detection function. For example, as illustrated in FIG. 3, the control device 160 can use the traffic line estimation function to estimate that the moving object moves in the length direction (X-direction) of the target pedestrian crosswalk from the end part of the sidewalk SW or roadside strip SS opposite to the target pedestrian crosswalk B1 to the target pedestrian crosswalk and estimate a traffic line S2 or S3 of the moving object waiting at the sidewalk or roadside strip.

The detection area setting function of the control device 160 is a function capable of setting a detection area for detecting a moving object on the basis of the traffic line of the moving object estimated using the traffic line estimation function. Details of a method of setting the detection area using the detection area setting function will be described later.

The moving object detection function of the control device 160 is a function capable of detecting a moving object in the detection area which is set using the detection area setting function. Specifically, the control device 160 can use the moving object detection function to detect a moving object using only the detection result in a detection area RT among the detection results detected by the ambient detection sensor 110 around the subject vehicle.

The travel control function of the control device 160 is a function capable of controlling the automated driving travel of the subject vehicle. Specifically, the control device 160 can use the travel control function to automatically execute the driving operation, which is ordinarily performed by the driver, through operating the drive control device 150 to control the driving mechanisms such as an engine and a brake and the steering mechanism such as a steering actuator on the basis of the detection results of the ambient detection sensor 110 and given travel conditions (such as traffic rules and a planned travel route). For example, the control device 160 can use the travel control function to perform the lane keeping control, which controls the traveling position of the subject vehicle in the width direction, through operating the drive control device 150 to control the operation of the steering actuator or the like so that the subject vehicle travels in a certain lane. In addition or alternatively, the control device 160 can use the travel control function to perform the follow-up travel control, which is for automatically following a preceding vehicle, through operating the drive control device 150 to control the operation of the driving mechanisms such as an engine and a brake so that the subject vehicle travels with a certain distance from the preceding vehicle. In addition or alternatively, the control device 160 can use the travel control function to automatically execute the right or left turn at an intersection, lane change, parking, stopping, and other necessary actions through controlling the driving mechanisms such as an engine and a brake and the steering mechanism such as a steering actuator on the basis of the detection results of the ambient detection sensor 110 and the given travel conditions. For example, in the present embodiment, when a moving object is detected in the detection area by the moving object detection function, the control device 160 can use the travel control function to control the driving mechanisms such as an engine and a brake thereby to stop the subject vehicle before a pedestrian crosswalk.

Figure 4:
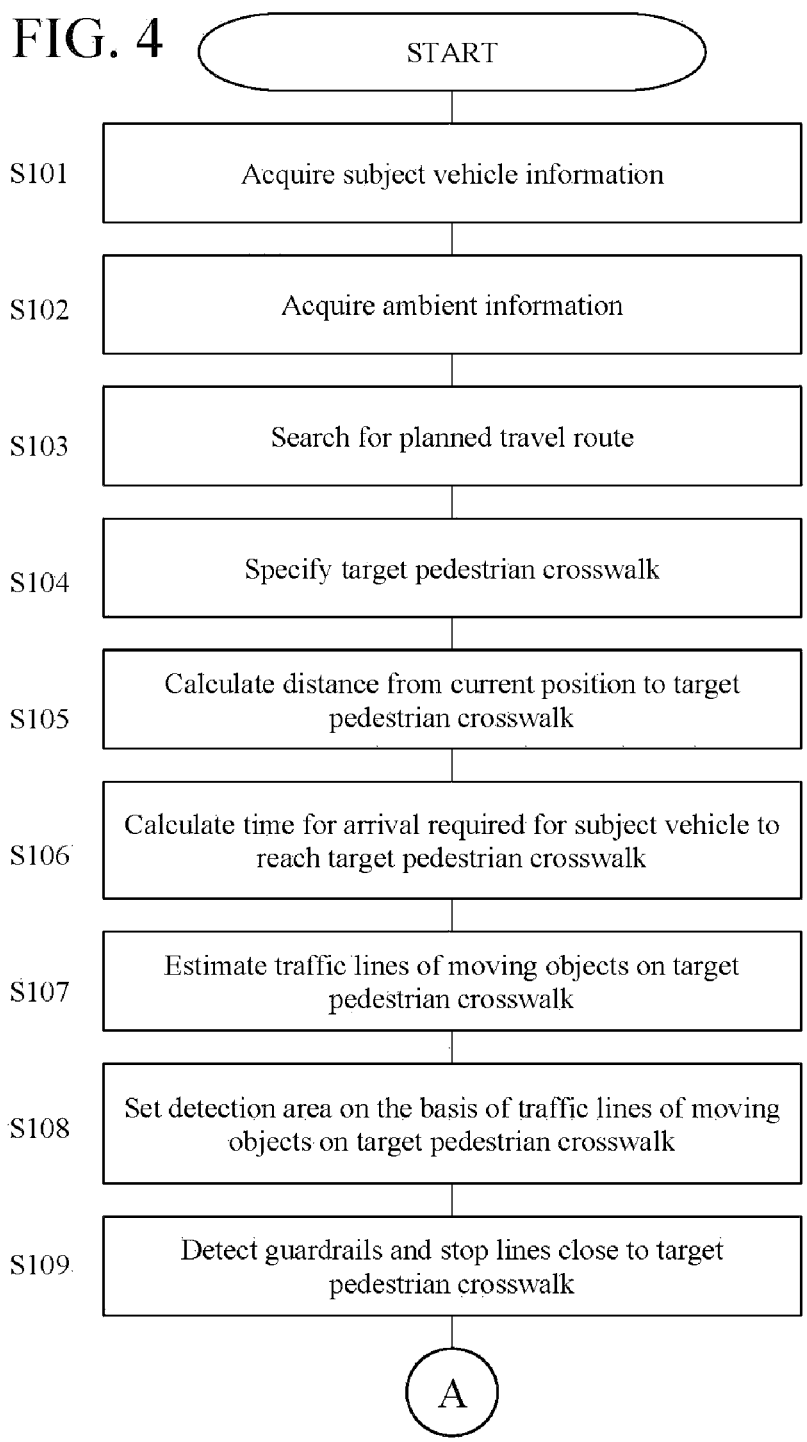
FIG. 4 is a flowchart (part 1) illustrating an example of the travel control process according to a first embodiment of the present invention.
Figure 5:
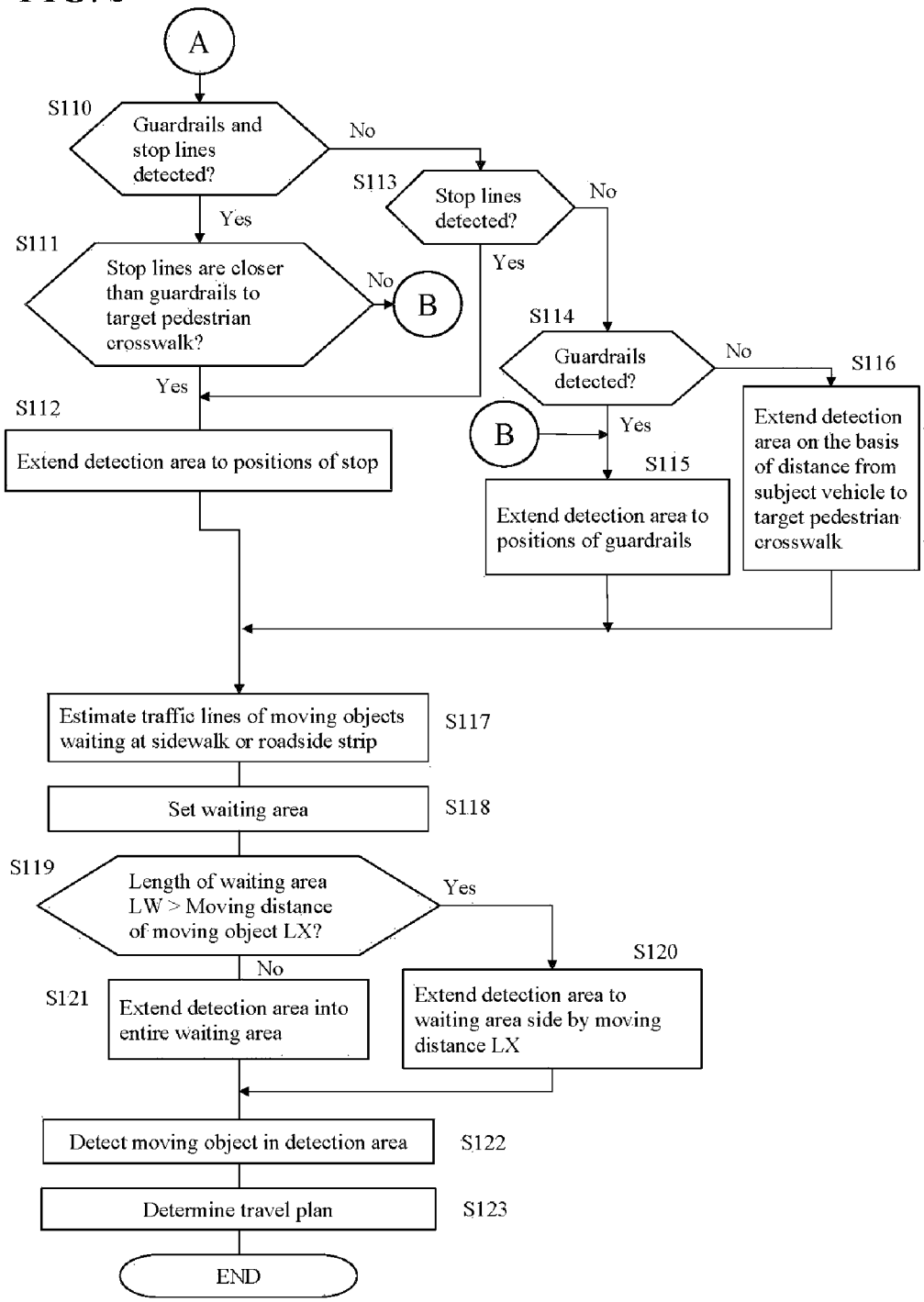
FIG. 5 is a flowchart (part 2) illustrating an example of the travel control process according to the first embodiment of the present invention.

A travel control process according to the first embodiment will now be described with reference to FIG. 4 and FIG. 5. FIG. 4 and FIG. 5 are flowcharts illustrating an example of the travel control process according to the first embodiment. The travel control process described below is executed by the control device 160. The travel control process described below is executed repeatedly at regular time intervals.

First, in step S101, the subject vehicle information acquisition function serves to acquire the subject vehicle information which includes the vehicle speed information and the position information. In step S102, the ambient information acquisition function serves to acquire the detection results of the ambient detection sensor 110 as the ambient information.

In step S103, the route search function serves to search for a planned travel route of the subject vehicle. For example, when the driver inputs a destination via an input device (not illustrated), the control device 160 can use the route search function to search for a route at a lane level on which the subject vehicle travels to the destination as the planned travel route on the basis of the map information stored in the database 140.

In step S104, the pedestrian crosswalk specifying function serves to specify a target pedestrian crosswalk. For example, when the planned travel route searched in step S103 intersects with the area of a pedestrian crosswalk included in the map information stored in the database 140, the control device 160 can use the pedestrian crosswalk specifying function to specify the pedestrian crosswalk as the target pedestrian crosswalk.

In step S105, the detection area setting function serves to calculate the distance from the current position of the subject vehicle to the target pedestrian crosswalk. The distance from the current position of the subject vehicle to the target pedestrian crosswalk may be the distance from the current position of the subject vehicle to the end part of the target pedestrian crosswalk on the subject vehicle side, or the distance from the current position of the subject vehicle to the center position in the width direction of the target pedestrian crosswalk, or the distance from the current position of the subject vehicle to the position of a node of the target pedestrian crosswalk.

For example, the control device 160 can use the detection area setting function to obtain the total sum of the lengths of links existing from the current position of the subject vehicle to the target pedestrian crosswalk thereby calculating the distance from the current position of the subject vehicle to the target pedestrian crosswalk. When no node exists at the target pedestrian crosswalk or at the current position of the subject vehicle, or when an error of a certain value or more occurs between the length of links to the target pedestrian crosswalk and the actual travel distance of the subject vehicle due to a curve or the like, the length of the centerline of the lane in which the subject vehicle travels from the current position of the subject vehicle to the target pedestrian crosswalk can be calculated on the basis of the map information thereby to calculate the distance from the current position of the subject vehicle to the target pedestrian crosswalk. In another configuration, if the map information does not include information on the center line of the lane, the lane centerline may be calculated from the right and left lane boundary lines of the lane in which the subject vehicle travels. In still another configuration, the distance from the current position of the subject vehicle to the target pedestrian crosswalk may be calculated by calculating the center line of the road on which the subject vehicle travels, rather than by calculating the lane center line.

In step S106, the detection area setting function serves to calculate an estimated time for arrival from the current position of the subject vehicle to the target pedestrian crosswalk on the basis of the distance to the target pedestrian crosswalk calculated in step S105. For example, when the distance from the current position of the subject vehicle to the target pedestrian crosswalk is D, the estimated time for arrival T to the target pedestrian crosswalk can be calculated as $T=D/V$ . . . (1) on the assumption that the subject vehicle travels at a current vehicle speed V which is a constant speed.

In addition or alternatively, the control device 160 can use the detection area setting function to calculate the estimated time for arrival T to the target pedestrian crosswalk by taking into account that the vehicle speed will decrease when the planned travel route of the subject vehicle slopes or the curvature is large. For example, the control device 160 can use the detection area setting function to calculate a longer estimated time for arrival T to the target pedestrian crosswalk as the slope on the planned travel route of the subject vehicle is larger or the curvature is larger. In an alternative embodiment, the control device 160 may use the detection area setting function to calculate the estimated time for arrival T to the target pedestrian crosswalk using a legal speed VL on the road on which the subject vehicle travels as substitute for the current speed V of the subject vehicle in the above equation (1).

In step S107, the traffic line estimation function serves to estimate the traffic line of a moving object in the target pedestrian crosswalk. For example, as illustrated in FIG. 2, the control device 160 can use the traffic line estimation function to estimate that the moving object crosses the target pedestrian crosswalk and estimate a traffic line S1 of the moving object on the target pedestrian crosswalk.

Figure 6:
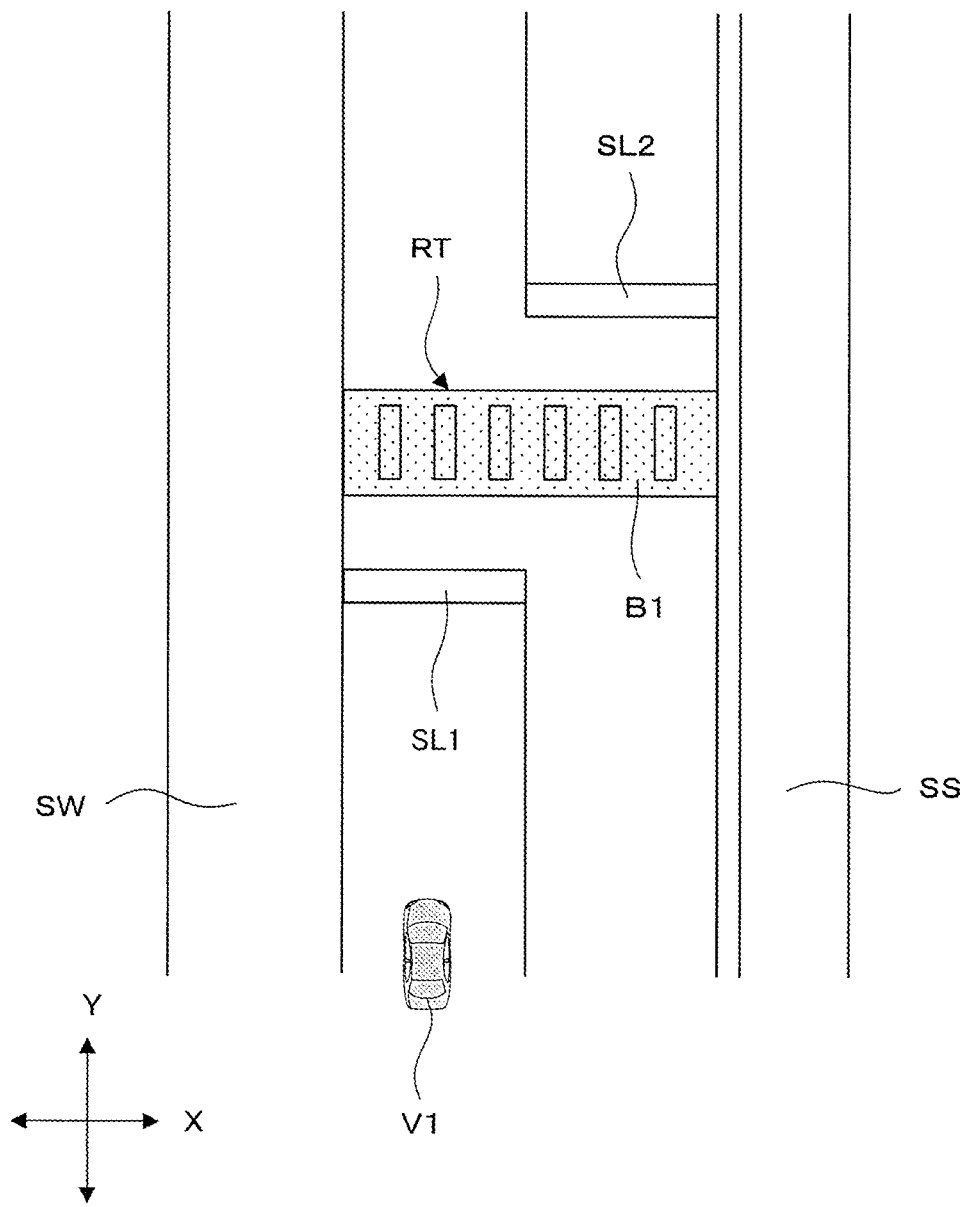
FIG. 6 is a diagram illustrating an example of a detection area.

In step S108, the detection area setting function serves to set a detection area on the basis of the traffic line of the moving object which is set in step S107. Specifically, the control device 160 uses the detection area setting function to set an area in which the traffic line of the moving object is estimated in the target pedestrian crosswalk, as the detection area. The control device 160 can use the detection area setting function to set the area of a target pedestrian crosswalk B1 as the detection area RT as illustrated in FIG. 6 because, in step S107, the traffic line of the moving object is estimated on the target pedestrian crosswalk.

In step S109, the detection area setting function serves to detect a guardrail and a stop line close to the target pedestrian crosswalk. Step S109 is followed by step S110 of FIG. 5, in which the detection area setting function serves to determine whether or not a guardrail and a stop line close to the target pedestrian crosswalk can be detected, on the basis of the detection results of step S109. When a guardrail and a stop line close to the target pedestrian crosswalk can be detected, the routine proceeds to step S111, while when a guardrail and a stop line cannot be detected, the routine proceeds to step S113.

Figure 7:
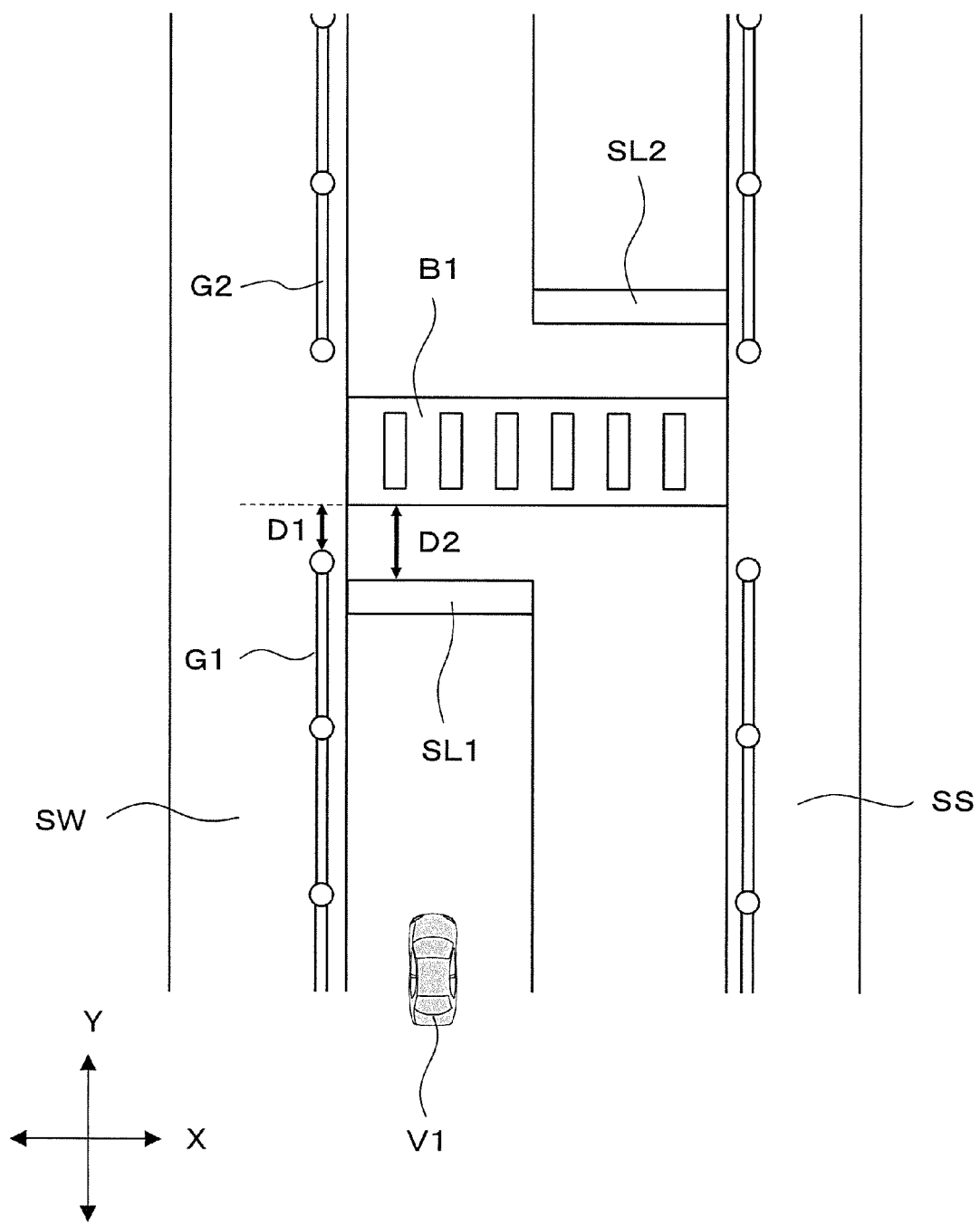
FIG. 7 is a diagram for describing an example of a method of setting the detection area when guardrails and stop lines exist.

In step S111, the detection area setting function serves to determine whether or not the stop line is closer than the guardrail to the target pedestrian crosswalk, because the guardrail and stop line close to the target pedestrian crosswalk are detected. FIG. 7 is a diagram for describing a method of setting a detection area when guardrails and stop lines exist. For example, in the example illustrated in FIG. 7, the control device 160 uses the detection area setting function to compare the distance D1 from the target pedestrian crosswalk B1 to a guardrail G1 with the distance D2 from the target pedestrian crosswalk B1 to a stop line SL1. In the example illustrated in FIG. 7, the distance D1 is shorter than the distance D2, and the control device 160 therefore determines that the guardrail G1 is closer than the stop line SL1 to the target pedestrian crosswalk B1 using the detection area setting function. When a determination is made that the stop line is closer than the guardrail to the target pedestrian crosswalk, the routine proceeds to step S112, while when a determination is made that the guardrail is closer than the stop line to the target crosswalk, the routine proceeds to S115.

When, in step S110, a determination is made that both a guardrail and a stop line cannot be detected, the routine proceeds to step S113. In step S113, the detection area setting function serves to determine whether or not a stop line close to the target pedestrian crosswalk is detected, on the basis of the detection results of step S109. When a stop line is detected, the routine proceeds to step S112, while when a stop line is not detected, the routine proceeds to step S114.

In step S114, the detection area setting function serves to determine whether or not a guardrail close to the target pedestrian crosswalk is detected, on the basis of the detection results of step S109. When a guardrail is detected, the routine proceeds to step S115, while when a guardrail is not detected, that is, when neither a stop line nor a guardrail is detected, the routine proceeds to step S116.

Figure 8:
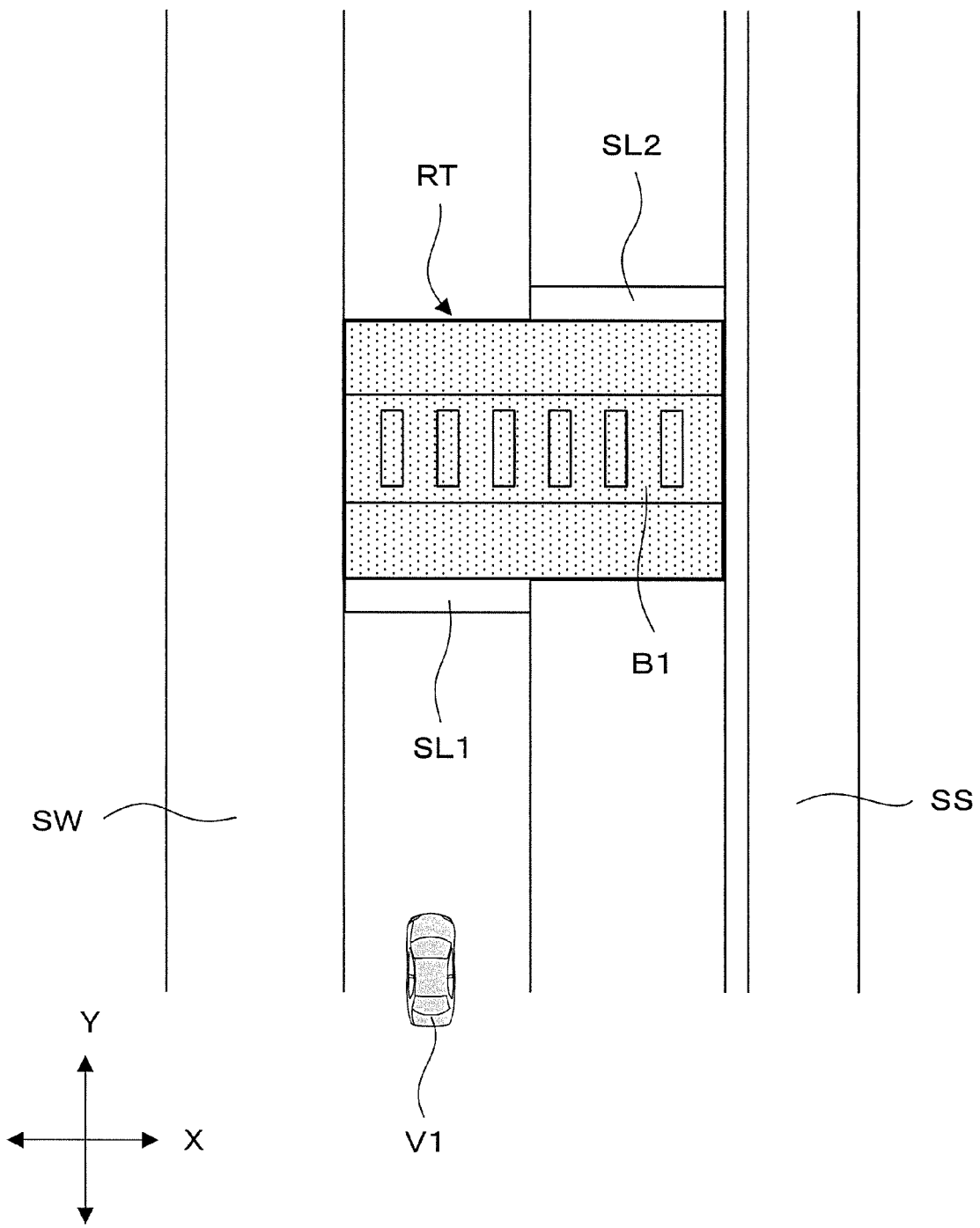
FIG. 8 is a diagram illustrating an example of the detection area when stop lines exist.

When a guardrail and a stop line close to the target pedestrian crosswalk are detected and a determination is made that the stop line is closer than the guardrail to the target pedestrian crosswalk (step S110=Yes and step S111=Yes), or when only a stop line close to the target pedestrian crosswalk is detected (step S113=Yes), the routine proceeds to step S112. In step S112, the detection area setting function serves to extend the detection area to the position of the stop line. FIG. 8 is a diagram illustrating an example of the detection area when stop lines exist. In the example illustrated in FIG. 8, only stop lines SL1 and SL2 close to the target pedestrian crosswalk B1 are detected, and the control device 160 therefore uses the detection area setting function to extend the detection area RT to the positions of the stop lines SL1 and S2 in the width direction (Y-direction) of the target pedestrian crosswalk B1.

Figure 9:
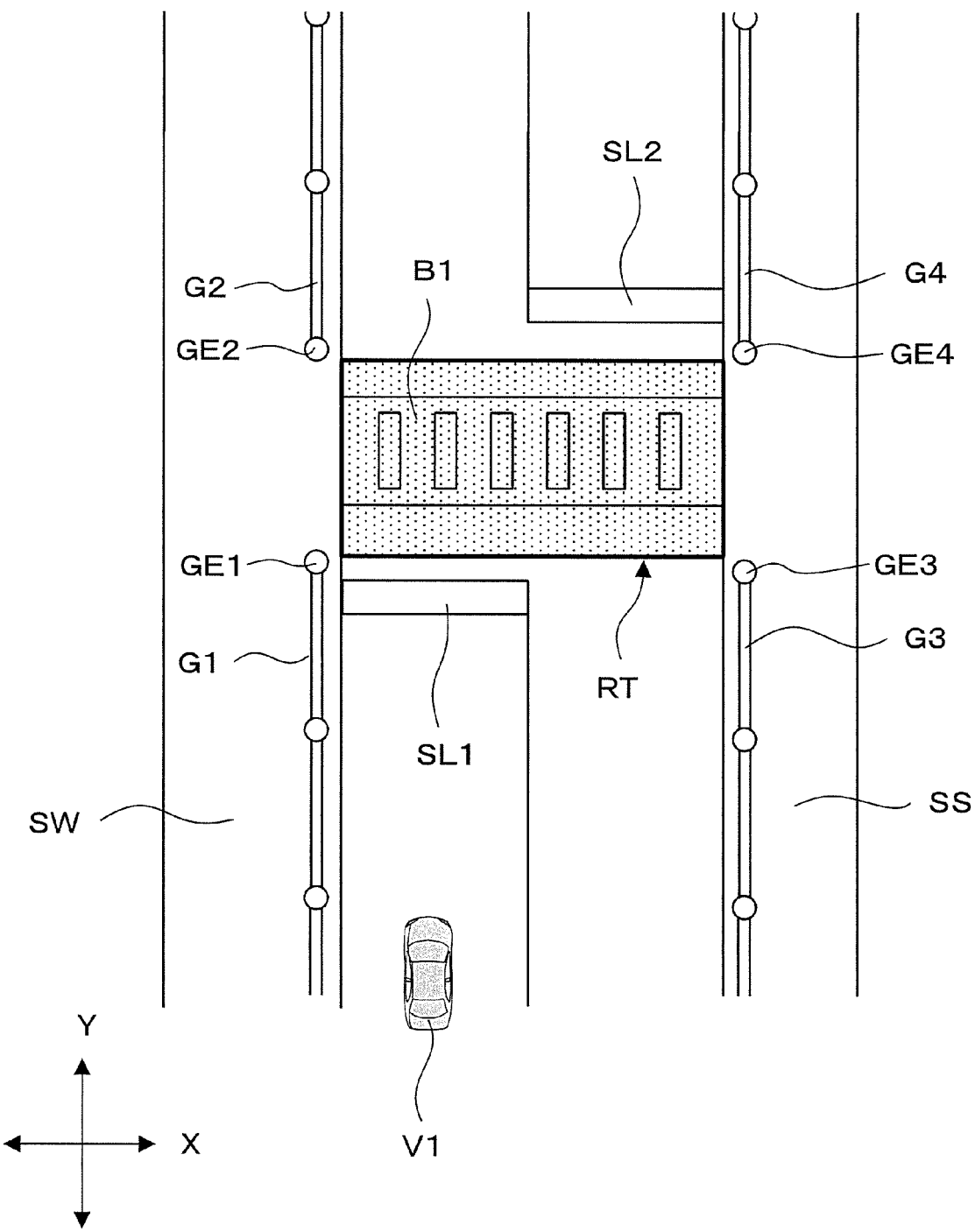
FIG. 9 is a diagram illustrating an example of the detection area when guardrails exist.

On the other hand, when a guardrail and a stop line close to the target pedestrian crosswalk are detected and a determination is made that the guardrail is closer than the stop line to the target pedestrian crosswalk (step S110=Yes and step S111=No), or when only a guardrail close to the target pedestrian crosswalk is detected (step S114=Yes), the routine proceeds to step S115. In step S115, the detection area setting function serves to extend the detection area in the width direction of the target pedestrian crosswalk to the position of an end part of the guardrail on the target pedestrian crosswalk side. FIG. 9 is a diagram for describing a method of setting the detection area in the scene illustrated in FIG. 7. As illustrated in FIG. 7, the distance D1 from the target pedestrian crosswalk B1 to the guardrail G1 is shorter than the distance D2 from the target pedestrian crosswalk B1 to the stop line SL1. Likewise, the distances from the target pedestrian crosswalk B1 to guardrails G2 to G4 are shorter than the distances from the target pedestrian crosswalk B1 to the stop lines SL1 and SL2. The detection area setting function therefore serves to extend the detection area RT in the width direction (Y-direction) of the target pedestrian crosswalk B1 to end parts GE1 to GE4 of the guardrails G1 and G2 on the target pedestrian crosswalk B1 side.

When neither a guardrail nor a stop line close to the target pedestrian crosswalk is detected (step S114=No), the routine proceeds to step S116. In step S116, the detection area setting function serves to extend the detection area on the basis of the distance from the subject vehicle to the target pedestrian crosswalk. FIG. 10A illustrates an example of the relationship between the distance from the subject vehicle to the target pedestrian crosswalk and the detection accuracy of the ambient detection sensor 110. As illustrated in FIG. 10A, as the distance from the subject vehicle to the target pedestrian crosswalk increases, the detection accuracy of the ambient detection sensor 110 deteriorates for the vicinity of the target pedestrian crosswalk. The control device 160 therefore uses the detection area setting function to extend the detection area in the width direction of the target pedestrian crosswalk as the distance from the target pedestrian crosswalk to the subject vehicle increases (when the distance from the target pedestrian crosswalk to the subject vehicle is a predetermined distance or more, extend the detection area as compared with when the distance from the target pedestrian crosswalk to the subject vehicle is less than the predetermined distance). For example, in the example illustrated in FIG. 10B, the distance from the target pedestrian crosswalk B1 to the subject vehicle V1 is larger than that in the example illustrated in FIG. 10C, so the control device 160 uses the detection area setting function to extend the detection area RT in the width direction (Y-direction) of the target pedestrian crosswalk B1. Thus, even when the distance from the subject vehicle to the target pedestrian crosswalk is long, the moving object can be stably detected by taking into account the detection accuracy of the ambient detection sensor 110 to set the detection area. In another configuration, the detection area setting function may serve to extend the detection area RT in the width direction (Y-direction) of the target pedestrian crosswalk B1 by a distance obtained through multiplying the distance from the target pedestrian crosswalk B1 to the subject vehicle V1 by a predetermined proportionality constant.

In step S117, the traffic line estimation function serves to estimate the traffic line of a moving object waiting at a road configuration close to the target pedestrian crosswalk before crossing the target pedestrian crosswalk. For example, in the example illustrated in FIG. 3, the control device 160 can use the traffic line estimation function to estimate traffic lines S2 and S3 of a moving object waiting at the sidewalk SW or the roadside strip SS, on the assumption that the moving object moves in the length direction (X-direction) of the target pedestrian crosswalk B1 across the width of the sidewalk SW and the width of the roadside strip SS.

Figure 11:
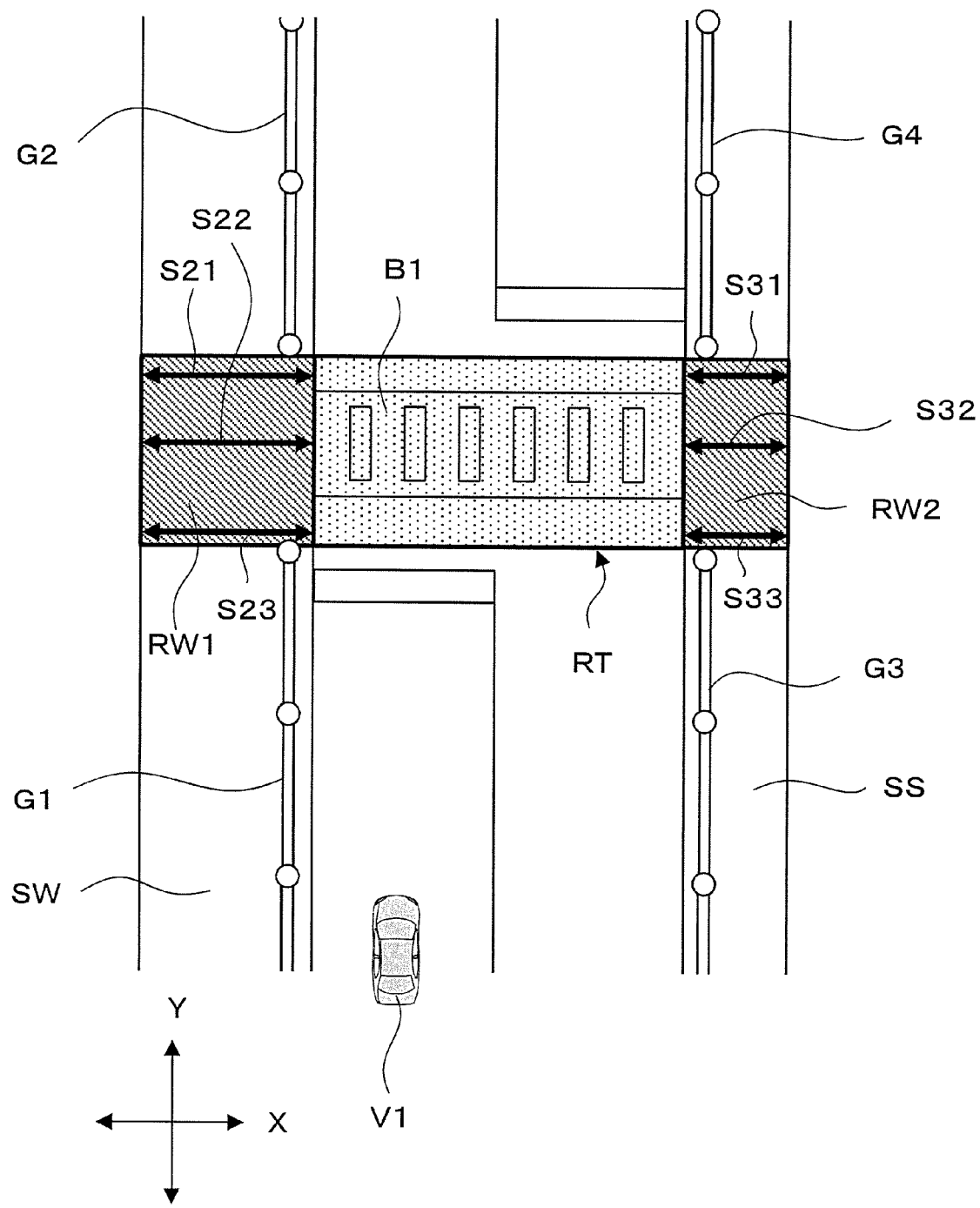
FIG. 11 is a diagram for describing examples of waiting areas.

It may also be conceivable that the moving object crossing the target pedestrian crosswalk B1 waits at a position deviating laterally from the target pedestrian crosswalk B1 (in FIG. 11, for example, a position on the upper side or lower side of the target pedestrian crosswalk B1) in the sidewalk or roadside strip close to the target pedestrian crosswalk. The control device 160 can therefore use the traffic line estimation function to estimate the traffic line of the moving object in a range that does not exceed the stop line and guardrail within the area of the sidewalk or roadside strip close to the target pedestrian crosswalk. For example, in the example illustrated in FIG. 11, the control device 160 can use the traffic line estimation function to estimate traffic lines S21 to S23 or S31 to S33 of moving objects in a specific area within the area of the sidewalk SW or roadside strip SS close to the detection area RT. The specific area is an area that lies in the width direction (Y-direction) of the target pedestrian crosswalk B1 to positions nearer to the target pedestrian crosswalk B1 among the positions of the stop lines SL1 and SL2 and guardrails G1 to G4 and that lies in the length direction (X-direction) of the target pedestrian crosswalk B1 from the detection area RT to the end part of the sidewalk SW or roadside strip SS. Through this operation, in the example illustrated in FIG. 11, the traffic lines S21 to S23 of moving objects are estimated in an area RW1 between the guardrails G1 and G2 within the sidewalk SW, and the traffic lines S31 to S33 of moving objects are estimated in an area RW2 between the guardrails G3 and G4 within the roadside strip SS.

In step S118, the detection area setting function serves to set the area of the sidewalk or roadside strip, which is estimated for the traffic lines of moving objects in step S117, as a waiting area. For example, in the example illustrated in FIG. 11, the areas RW1 and RW2 of the sidewalk SW and roadside strip SS estimated in step S117 for the traffic lines of moving objects are each set as the waiting area.

In step S119, the detection area setting function serves to compare a length LW of the waiting area, which is set in step S118, in the length direction of the target pedestrian crosswalk with a moving distance LX in which the moving object moves until the subject vehicle reaches the target pedestrian crosswalk. First, the control device 160 uses the detection area setting function to acquire the moving speed of a moving object stored in the ROM of the control device 160. For example, the control device 160 can use the detection area setting function to acquire an average moving speed Vp (e.g. 80 m/min) of a pedestrian stored in the ROM of the control device 160 as the moving speed of a moving object. The moving speed of a moving object is not limited to the average moving speed of a pedestrian and, for example, the average moving speed of a bicycle may also be used as the moving speed of a moving object. In a pedestrian crosswalk with frequent traffic of aged pedestrians, the average moving speed of a pedestrian such as an aged pedestrian having a relatively low moving speed may be used as the moving speed of a moving object. Then, the control device 160 uses the detection area setting function to multiply the time for arrival T, which is calculated in step S106 for the subject vehicle to reach the target pedestrian crosswalk, by the moving speed Vp of a moving object, thereby calculating the moving distance LX ($LX = T \times Vp$) in which the moving object moves until the subject vehicle reaches the target pedestrian crosswalk.

Then, the control device 160 uses the detection area setting function to compare the length LW of the waiting area in the length direction of the target pedestrian crosswalk with the moving distance LX in which the moving object moves until the subject vehicle reaches the target pedestrian crosswalk. For example, in the example illustrated in FIG. 12, the length LW1 of the waiting area RW1 is longer than the moving distance LX1 in which the moving object moves until the subject vehicle V1 reaches the target pedestrian crosswalk B1. On the other hand, the length LW2 of the waiting area RW2 is the same length as the moving distance LX2 in which the moving object moves until the subject vehicle V1 reaches the target pedestrian crosswalk B1.

When, in step S119, the length LW of the waiting area is longer than the moving distance of the moving object, the routine proceeds to step S120. In step S120, the detection area setting function serves to extend the detection area in the length direction of the target pedestrian crosswalk to a position in the waiting area distant from the target pedestrian crosswalk by the movement distance LX. For example, in the example illustrated in FIG. 12, the length LW1 of the waiting area RW1 is longer than the moving distance LX1 of the moving object, and the control device 160 therefore uses the detection area setting function to extend the detection area RT, as illustrated in FIG. 13, in the length direction (X-direction) of the target pedestrian crosswalk B1 to a position P1 in the waiting area RW1 distant from the target pedestrian crosswalk B1 by the movement distance LX.

On the other hand, when, in step S119, the length LW of the waiting area is not longer than the moving distance LX of the moving object, the routine proceeds to step S121. In step S121, the detection area setting function serves to extend the detection area into the entire waiting area. For example, in the example illustrated in FIG. 12, the length LW2 of the waiting area RW2 is the same length as the moving distance LX2 of the moving object, and the detection area setting function therefore serves to extend the detection area RT into the entire waiting area RW2.

In step S122, the moving object detection function serves to detect the moving object in the detection area extended in step S120 or step S121. Then, in step S123, the travel control function serves to determine the travel plan of the subject vehicle on the basis of the detection results of the moving object in step S122 and perform the travel control. For example, in the present embodiment, when a moving object is detected in the detection area, control is performed to stop the subject vehicle before the target pedestrian crosswalk.

As described above, in the first embodiment, the pedestrian crosswalk through which the subject vehicle is expected to pass is specified as a target pedestrian crosswalk, and the road configuration close to the target pedestrian crosswalk is detected. Then, the traffic line of a moving object crossing the target pedestrian crosswalk is estimated on the basis of the road configuration close to the target pedestrian crosswalk. Further, an area including the estimated traffic line of the moving object is set as a detection area, and the moving object is detected in the detection area. Thus, in the first embodiment, the traffic line of the moving object crossing the target pedestrian crosswalk is estimated on the basis of the road configuration close to the target pedestrian crosswalk, and an area in which the moving object is highly possible to move when crossing the target pedestrian crosswalk can thereby be set as the detection area. The moving object crossing the target pedestrian crosswalk can therefore be appropriately detected. Moreover, the area in which the moving object is highly possible to move when crossing the target pedestrian crosswalk is set as the detection area, and the accuracy in detecting the moving object can thereby be enhanced as compared with when the moving object is detected in the entire area around the subject vehicle.

Furthermore, in the present embodiment, a sidewalk and a roadside strip close to the target pedestrian crosswalk are each detected as the road configuration close to the pedestrian crosswalk and it is thereby possible to appropriately detect not only a moving object crossing the target pedestrian crosswalk but also a moving object waiting at the sidewalk or roadside strip close to the target pedestrian crosswalk to cross the target pedestrian crosswalk.

Figure 12:
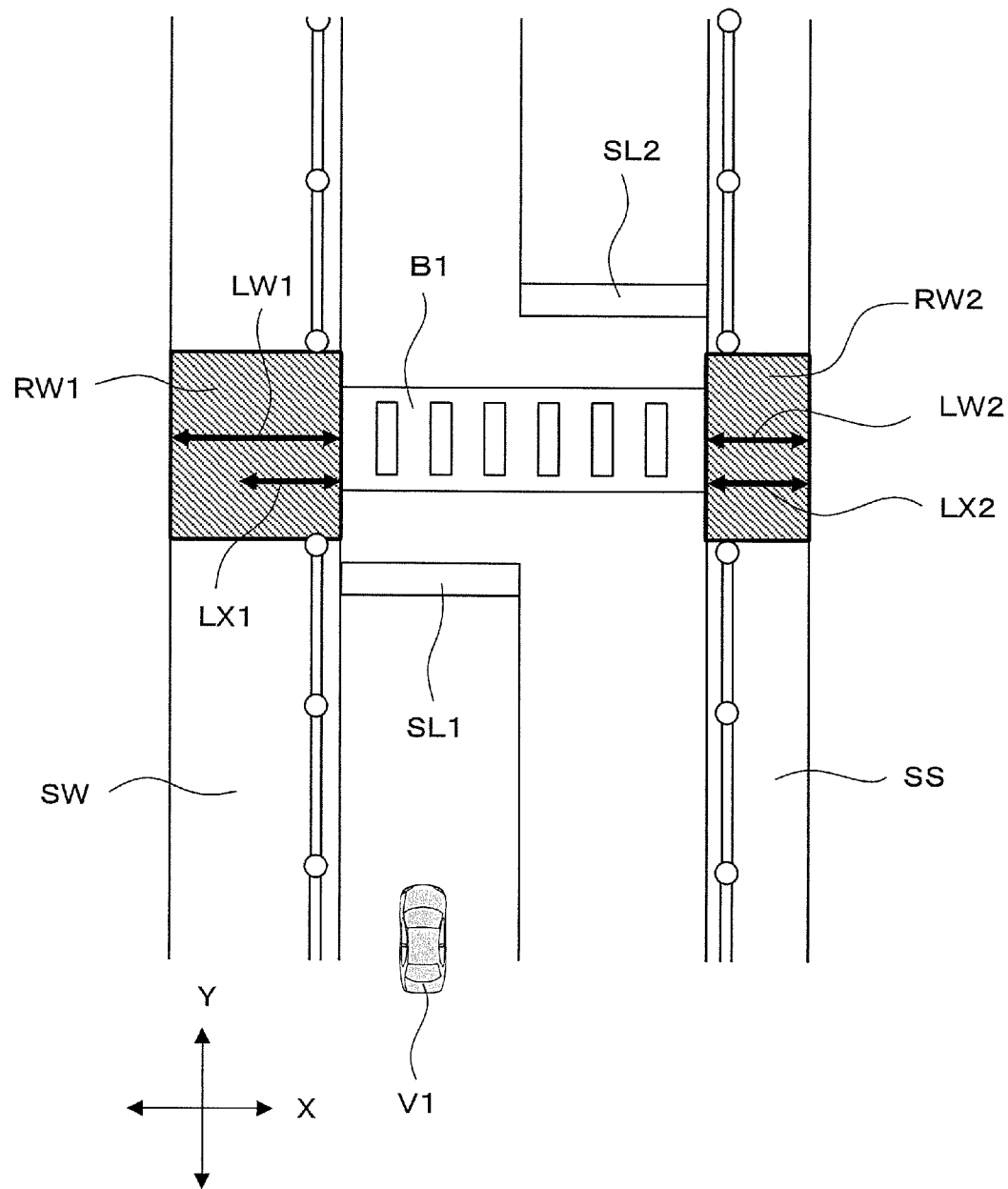
FIG. 12 is a diagram for describing examples of the lengths of waiting areas and the moving distances.
Figure 13:
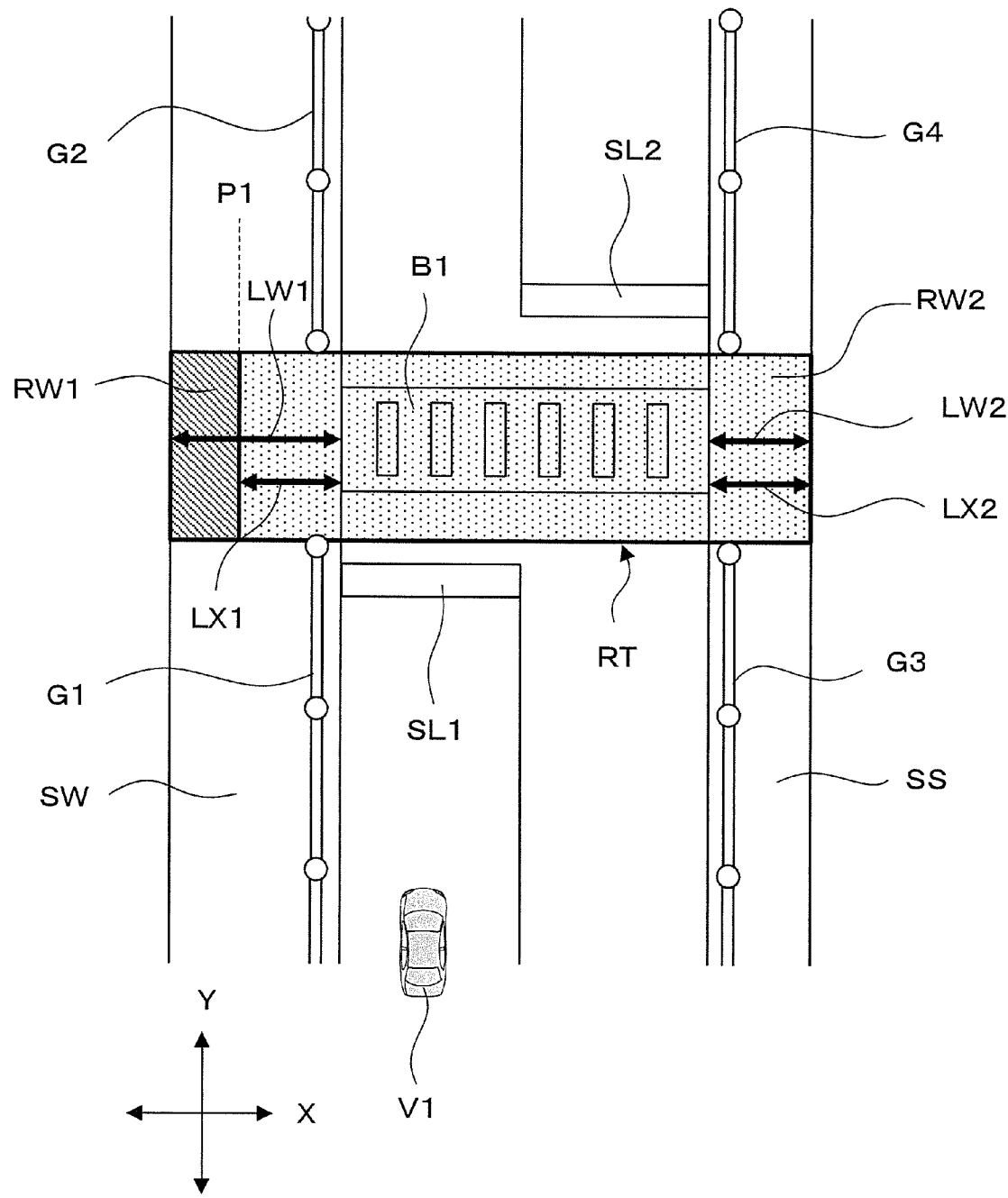
FIG. 13 is a diagram illustrating an example of the detection area extended into waiting areas.

In the present embodiment, as illustrated in FIG. 12, the moving distance LX in which the moving object moves until the subject vehicle V1 reaches the target pedestrian crosswalk B1 is calculated on the basis of the moving speed of the moving object. Then, the detection area RT is extended to a specific area of the waiting area RW1 or RW2 in which the traffic line of the moving object waiting at the road configuration SW or SS is estimated. The specific area is an area in which the distance from the target pedestrian crosswalk B1 is the moving distance LX or less. Thus, the area in which the moving object can reach the target pedestrian crosswalk B1 before the subject vehicle V1 reaches the target pedestrian crosswalk B1 is set as the detection area RT and it is thereby possible to detect the moving object which may come close to the subject vehicle V1 when the subject vehicle V1 reaches the target pedestrian crosswalk B1.

In the present embodiment, as illustrated in FIG. 8, when the stop lines SL1 and SL2 exist before the target pedestrian crosswalk B1, the detection area RT is extended in the width direction (Y-direction) of the target pedestrian crosswalk B1 to the positions of the stop lines SL1 and SL2. Through this operation, moving objects moving between the target pedestrian crosswalk and the stop lines can be appropriately detected. In the present embodiment, as illustrated in FIG. 7, when the guardrails G1 to G4 are provided at the sidewalk SW and roadside strip SS close to the target pedestrian crosswalk B1, the detection area RT is extended in the width direction (Y-direction) of the target pedestrian crosswalk B1 to the positions corresponding to the end parts GE1 to GE4 of the guardrails G1 to G4 on the target pedestrian crosswalk B1 side. This allows for appropriate detection of moving objects that cross the areas between the guardrails and the target pedestrian crosswalk while deviating from the target pedestrian crosswalk.

Second Embodiment

A travel control apparatus for a vehicle according to a second embodiment of the present invention will then be described. The travel control apparatus 100 for a vehicle according to the second embodiment has the same configuration as that in the first embodiment except that it operates as follows.

The control device 160 according to the second embodiment has a crossing possibility determination function of determining whether or not crossing is possible at an adjacent pedestrian crosswalk close to the target pedestrian crosswalk and a merging area setting function of setting an area on the road configuration in which a moving object moves toward the target pedestrian crosswalk as a merging area, in addition to the functions of the first embodiment.

The crossing possibility determination function is a function capable of determining whether or not crossing is possible at an adjacent pedestrian crosswalk close to the target pedestrian crosswalk. For example, the control device 160 can use the crossing possibility determination function to acquire the captured image of a traffic signal for vehicles provided before the target pedestrian crosswalk from a camera attached to the subject vehicle. Then, the control device 160 can use the crossing possibility determination function to determine the signal of the traffic signal for vehicles located before the target pedestrian crosswalk on the basis of the acquired captured image to determine the signal of a traffic signal for pedestrians that is provided at the adjacent pedestrian crosswalk. For example, when the signal of the traffic signal for vehicles is a signal that permits vehicles to travel, the crossing possibility determination function can serve to determine that crossing is not possible at the adjacent pedestrian crosswalk. On the contrary, when the signal of the traffic signal for vehicles is a signal that prohibits vehicles from traveling, the crossing possibility determination function can serve to determine that crossing is possible at the adjacent pedestrian crosswalk. Then, when a determination is made that crossing is possible at the adjacent pedestrian crosswalk, the detection area setting function can serve to set an area including the area of the adjacent pedestrian crosswalk as the detection area. On the other hand, when a determination is made that crossing is not possible at the adjacent pedestrian crosswalk, the detection area setting function can serve to set an area that does not include the area of the adjacent pedestrian crosswalk, as the detection area.

Figure 14:
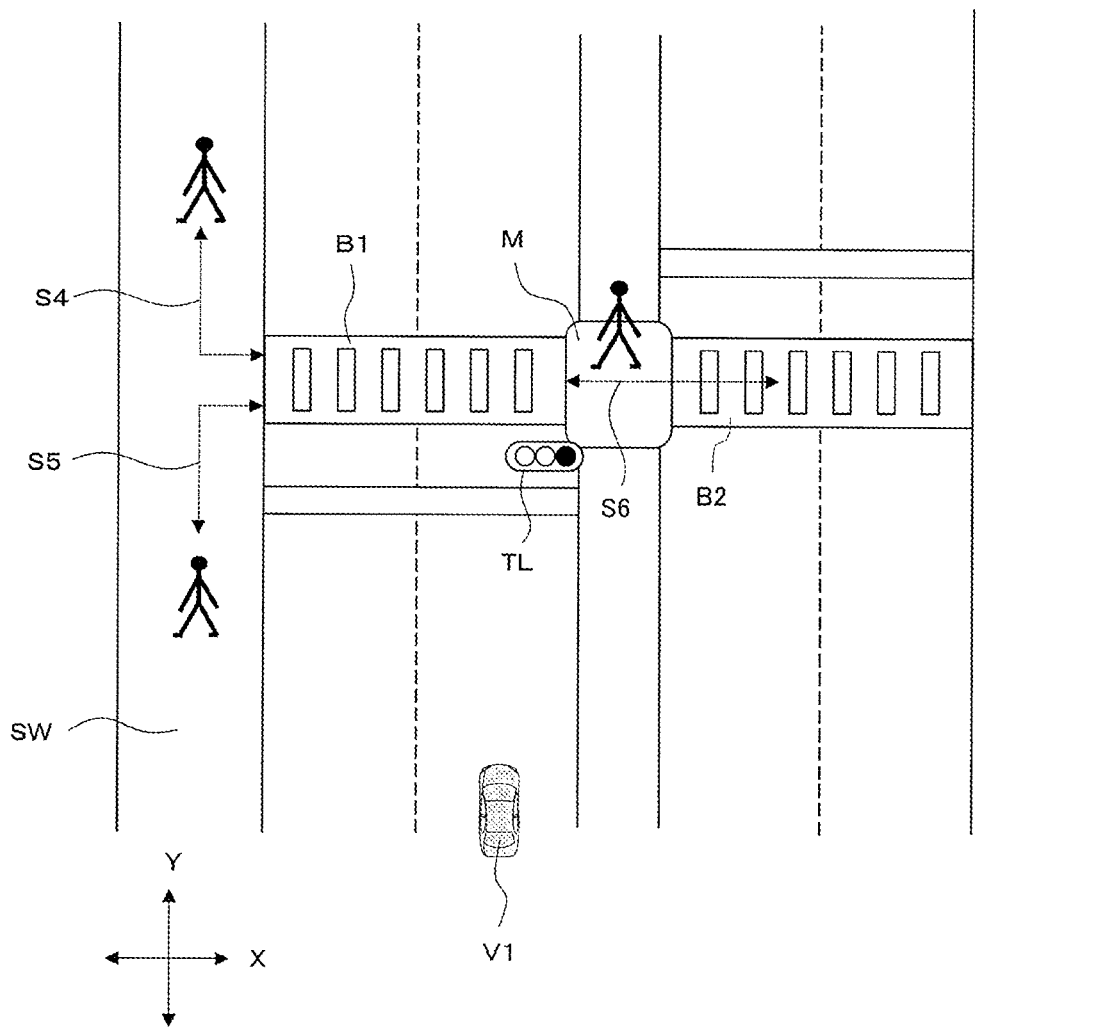
FIG. 14 is a diagram exemplifying an example of the traffic line of a moving object moving toward the target pedestrian crosswalk in a sidewalk, a roadside strip, or a median strip.

The merging area setting function of the control device 160 is a function capable of setting an area on the road configuration when a moving object moves toward the target pedestrian crosswalk, as a merging area. Specifically, the control device 160 can use the merging area setting function first to estimate the traffic line of a moving object that moves on a sidewalk, a roadside strip, a median strip, or an adjacent pedestrian crosswalk close to the target pedestrian crosswalk. FIG. 14 is a diagram illustrating examples of the traffic lines on a road configuration of moving objects that move toward the target pedestrian crosswalk. For example, in the example illustrated in FIG. 14, the control device 160 can use the merging area setting function to estimate traffic lines S4 and S5 on the sidewalk SW close to the target pedestrian crosswalk B1 and estimate a traffic line S6 on the median strip M and the adjacent pedestrian crosswalk B2.

Then, the control device 160 can use the merging area setting function to set an area on the road configuration in which the moving object moves toward the target pedestrian crosswalk as the merging area on the basis of the traffic line of the moving object on the road configuration. Specifically, the control device 160 can use the merging area setting function to multiply the estimated time for arrival T, which is required for the subject vehicle to reach the target pedestrian crosswalk, by the moving speed Vp of the moving object, as represented by the above equation (1), to calculate the moving distance LX in which the moving object moves until the subject vehicle reaches the target pedestrian crosswalk. Then, the control device 160 can use the merging area setting function to set a specific area of the area of the sidewalk SW, roadside strip, median strip, and adjacent pedestrian crosswalk close to the target pedestrian crosswalk, as the merging area. The specific area is an area in which the distance from the target pedestrian crosswalk along the traffic line of the moving object is equal to or less than the moving distance LX in which the moving object moves until the subject vehicle reaches the target pedestrian crosswalk.

Figure 15:
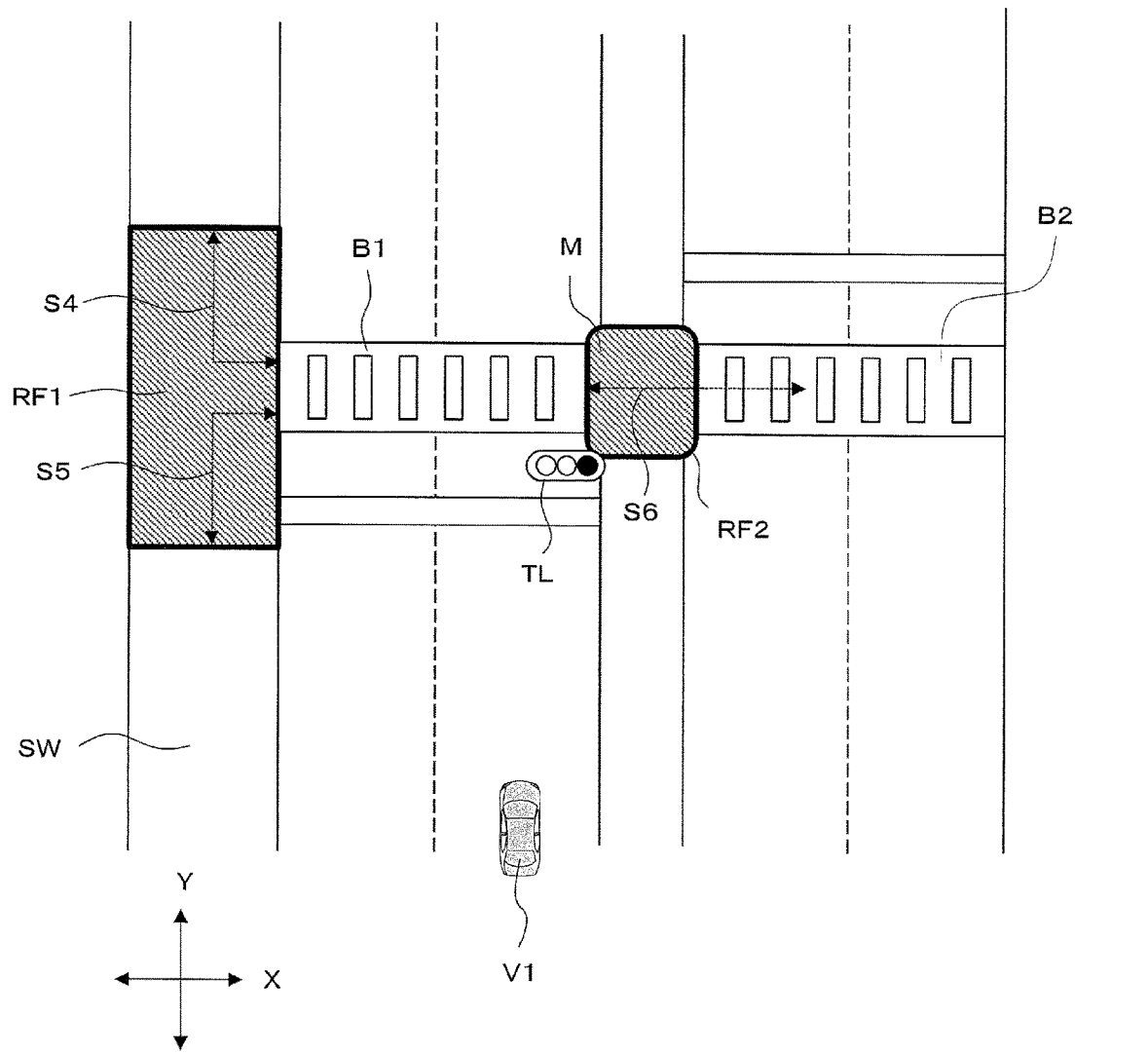
FIG. 15 is a diagram for describing examples of merging areas.

For example, in the example illustrated in FIG. 15, it is assumed that the lengths of the traffic lines S4 to S6 of the moving objects each represent the moving distance LX in which each moving object moves until the subject vehicle reaches the target pedestrian crosswalk. In this case, as illustrated in FIG. 15, the control device 160 can use the merging area setting function to set a specific area RF1 of the sidewalk SW close to the target pedestrian crosswalk B1 as the merging area. The specific area RF1 is an area in which the distances from the target pedestrian crosswalk B1 along the traffic lines S4 and S5 of the moving objects are equal to or less than the moving distance LX in which each moving object moves until the subject vehicle V1 reaches the target pedestrian crosswalk B1. In addition or alternatively, the control device 160 can use the merging area setting function to set a specific area RF2 of the median strip M and adjacent pedestrian crosswalk B2 close to the target pedestrian crosswalk B1 as the merging area. The specific area RF2 is an area in which the distance from the target pedestrian crosswalk B1 along the traffic line S6 of the moving object is equal to or less than the moving distance LX in which the moving object moves until the subject vehicle V1 reaches the target pedestrian crosswalk B1.

When the moving object cannot cross the adjacent pedestrian crosswalk as a result of determination made using the crossing possibility determination function, the control device 160 uses the merging area setting function so as not to set the area of the adjacent pedestrian crosswalk as the merging area. For example, in the example illustrated in FIG. 15, a part of the adjacent pedestrian crosswalk B2 falls within a range of the moving distance LX from the target pedestrian crosswalk B1, but a determination is made that crossing is not possible at the adjacent pedestrian crosswalk B2 as a result of the crossing possibility determination. The control device 160 therefore uses the merging area setting function to set only the area of the median strip M as the merging area RF2 so that the area of the adjacent pedestrian crosswalk B2 is not included in the merging area RF2.

The detection area setting function according to the second embodiment is a function capable of setting an area comprising the area of the target pedestrian crosswalk and the merging area as the detection area. For example, in the example illustrated in FIG. 16, the control device 160 can use the detection area setting function to set an area that includes the area RB1 of the target pedestrian crosswalk B1 and the merging areas RF1 and RF2 as the detection area. Although not illustrated, when crossing is possible at the adjacent pedestrian crosswalk B2, in the area of the adjacent pedestrian crosswalk B2, an area in which the distance from the target pedestrian crosswalk B1 is the moving distance LX or less can also be included in the detection area RT.

Figure 17:
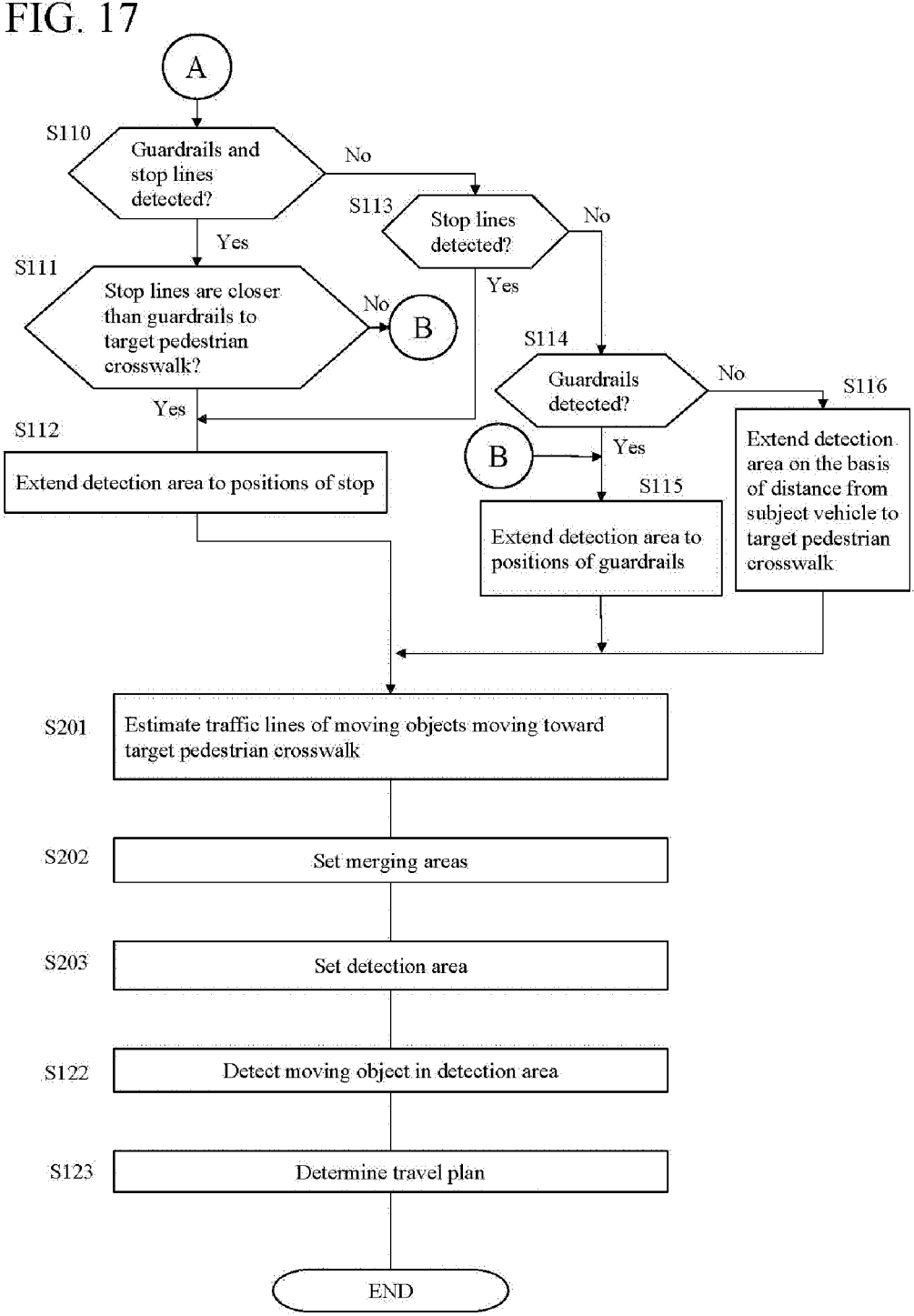
FIG. 17 is a flowchart illustrating an example of the travel control process according to the second embodiment of the present invention.

With reference to FIG. 17, an example of the travel control process according to the second embodiment will then be described. The processes of steps S101 to S116 are performed in the same manner as in the first embodiment and the description will be omitted.

In step S201, the merging area setting function serves to estimate the traffic line of a moving object moving toward the target pedestrian crosswalk on the basis of the road configuration close to the target pedestrian crosswalk. For example, as illustrated in FIG. 14, the control device 160 can use the merging area setting function to estimate the traffic lines S4 to S6 of the moving objects moving toward the target pedestrian crosswalk on the basis of the road configuration close to the target pedestrian crosswalk.

In step S202, the merging area setting function serves to set the merging area on the basis of the traffic line of a moving object estimated in step S201. For example, as illustrated in FIG. 15, the control device 160 can use the merging area setting function to set specific areas RF1 and RF2 that are areas along the traffic lines S4 to S6 of the moving objects moving toward the target pedestrian crosswalk B1, as the merging areas. The specific areas RF1 and RF2 are those in which the distance from the target pedestrian crosswalk B1 is equal to or less than the moving distance LX in which each moving object moves until the subject vehicle V1 reaches the target pedestrian crosswalk B1. When the moving object cannot cross the adjacent pedestrian crosswalk B2 as illustrated in FIG. 15, the control device 160 uses the merging area setting function so as not to include the area of the adjacent pedestrian crosswalk B2 in the merging areas.

Figure 16:
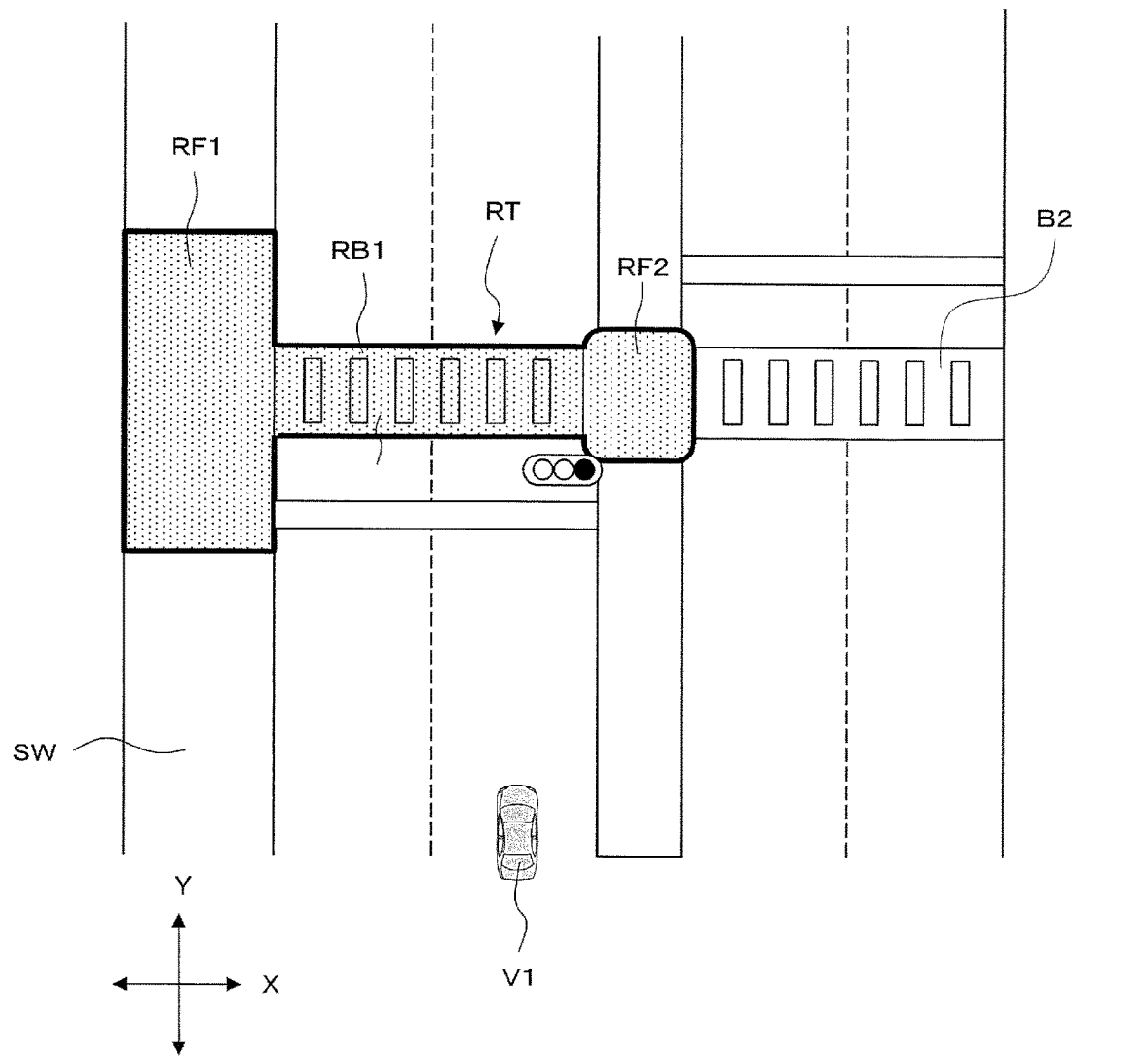
FIG. 16 is a diagram illustrating the detection area according to a second embodiment of the present invention.

In step S203, the detection area setting function serves to set the detection area. In the second embodiment, as illustrated in FIG. 16, the control device 160 uses the detection area setting function to set an area comprising the area of the target pedestrian crosswalk B1 and the merging areas RF1 and RF2 set in step S202 as the detection area RT.

As described above, in the second embodiment, a specific area of the area of a road configuration (such as a sidewalk, roadside strip, median strip, or adjacent pedestrian crosswalk) close to the target pedestrian crosswalk is set as the merging area. The specific area is an area in which the moving object can reach the target pedestrian crosswalk before the subject vehicle reaches the target pedestrian crosswalk. Then, an area comprising the area of the target pedestrian crosswalk and the merging area is set as the detection area. Through this operation, in addition to the effects of the first embodiment, an effect is obtained that a moving object that may come close to the subject vehicle at the target pedestrian crosswalk when the subject vehicle reaches the target pedestrian crosswalk can be appropriately detected.

Moreover, in the present embodiment, the area of the median strip M which connects between the target pedestrian crosswalk B1 and the adjacent pedestrian crosswalk B2 is set as the merging area RF2, as illustrated in FIG. 15, and therefore it is also possible to appropriately detect a moving object that moves on the median strip toward the target pedestrian crosswalk. Furthermore, in the present embodiment, a moving object that moves on the adjacent pedestrian crosswalk toward the target pedestrian crosswalk can also be appropriately detected because the merging area can be set on the adjacent pedestrian crosswalk. In addition, when crossing is not possible at the adjacent pedestrian crosswalk, the detection area is set so as not to include the area of the adjacent pedestrian crosswalk, thereby to allow for appropriate detection of a moving object that can move to the target pedestrian crosswalk, among moving objects existing around the subject vehicle.

Embodiments heretofore explained are described to facilitate understanding of the present invention and are not described to limit the present invention. It is therefore intended that the elements disclosed in the above embodiments include all design changes and equivalents to fall within the technical scope of the present invention.

Figure 18:
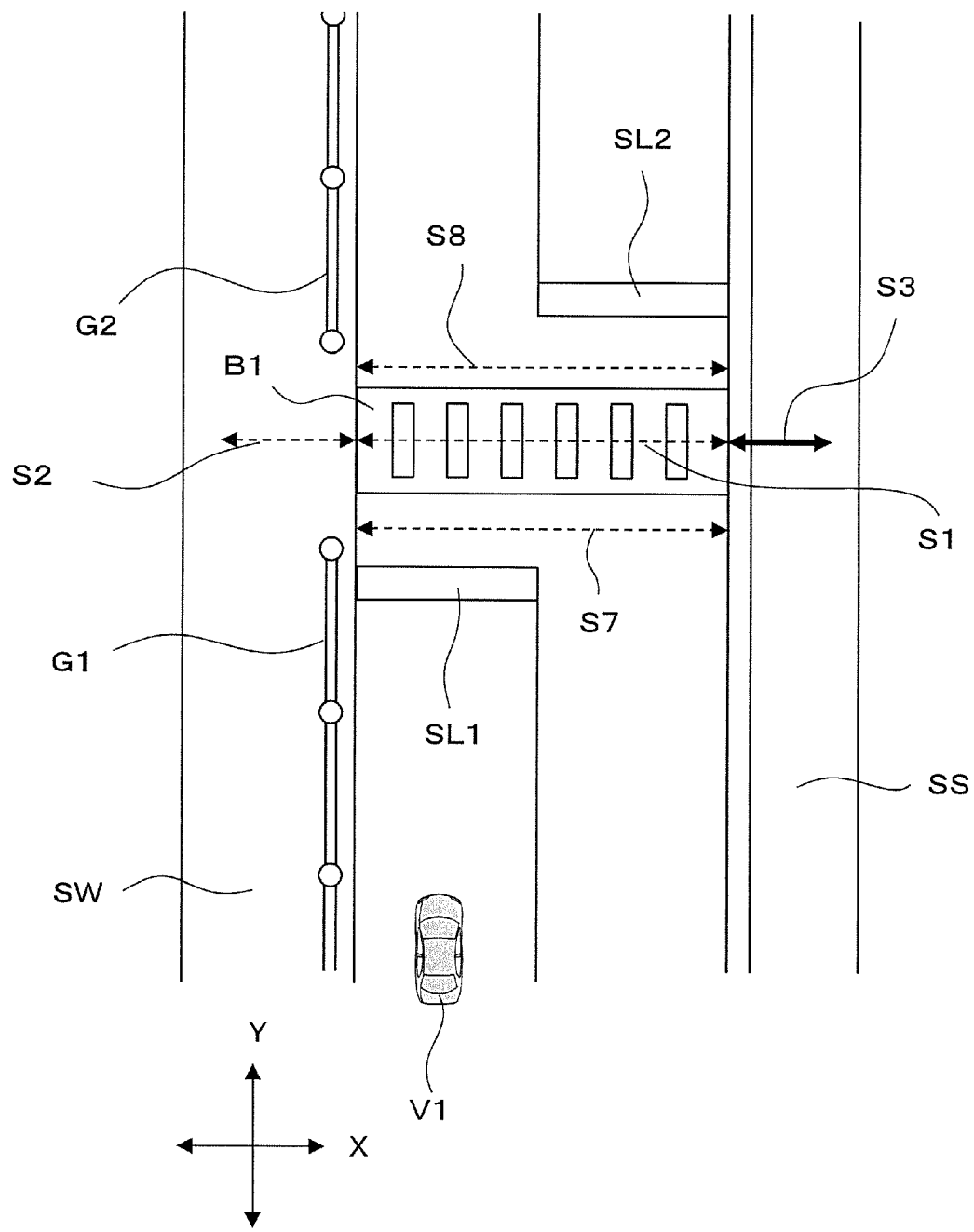
FIG. 18 is diagram for describing another example of the method of estimating traffic lines of moving objects.

For example, in the above-described embodiments, a configuration is exemplified in which the traffic line of a moving object on the target pedestrian crosswalk is estimated on the assumption that the moving object moves on the target pedestrian crosswalk, but the present invention is not limited to this configuration and another configuration can also be employed in which, for example, the traffic line of a moving object is estimated on or around the target pedestrian crosswalk with consideration that the moving object may deviate laterally from the target pedestrian crosswalk and cross the target pedestrian crosswalk. For example, as illustrated in FIG. 18, the traffic line estimation function may be able to estimate traffic lines S1 to S3, S7, and S8 of moving objects on the assumption that the moving objects move in a range that does not exceed the stop lines SL1 and SL2 located before the target pedestrian crosswalk B1, that is, a range from the target pedestrian crosswalk B1 to the stop lines SL1 and SL2. In addition or alternatively, as illustrated in FIG. 18, when guardrails G1 and G2 exist on the sidewalk SW or roadside strip SS, the traffic line estimation function may be able to estimate the traffic lines S7 and S8 of moving objects on the assumption that the moving objects move on the target pedestrian crosswalk B1 side than the guardrails G1 and G2. In addition or alternatively, when stop lines SL1 and SL2 and guardrails G1 and G2 exist, the traffic line estimation function may be able to estimate the traffic lines of moving objects on the assumption that the moving objects move in a range from ones of the stop lines SL1 and SL2 and the guardrails G1 and G2, which are closer to the target pedestrian crosswalk B1, to the target pedestrian crosswalk B1. For example, in the example illustrated in FIG. 18, the guardrails G1 and G2 are closer than the stop lines SL1 and SL2 to the target pedestrian crosswalk B1, and the traffic line estimation function can therefore serve to estimate the traffic lines S7 and S8 of moving objects on the assumption that the moving objects move in the range from the target pedestrian crosswalk B1 to the guardrails G1 and G2.

In the above-described embodiments, a configuration is exemplified in which the moving distance for a moving object to move until the subject vehicle reaches the target pedestrian crosswalk is calculated by acquiring the moving speed of the moving object which is preliminarily stored in the ROM of the control device 160, but the present invention is not limited to this configuration and another configuration can also be employed in which an actual moving speed of the moving object is calculated by repeatedly detecting the moving object and the moving distance for the moving object to move until the subject vehicle reaches the target pedestrian crosswalk is calculated on the basis of the calculated actual moving speed of the moving object.

In the above-described second embodiment, a configuration is exemplified in which, as illustrated in FIG. 16, the area of the adjacent pedestrian crosswalk B2 is not set as the detection area RT when a determination is made that the moving object cannot cross the adjacent pedestrian crosswalk B2 on the basis of the signal indication of the traffic signal for vehicles, but the present invention is not limited to this configuration and another configuration can also be employed in which, for example, the area of the target pedestrian crosswalk B1 is not set as the detection area RT when a determination is made that the moving object cannot moves on the target pedestrian crosswalk B1 on the basis of the signal indication of the traffic signal for vehicles.

In the above-described second embodiment, a configuration is exemplified in which an area that allows a moving object to move to the target pedestrian crosswalk until the subject vehicle reaches the target pedestrian crosswalk is set as the merging area, but the present invention is not limited to this configuration and another configuration can also be employed in which, for example, a predetermined area of the road configuration close to the target pedestrian crosswalk is set as the merging area. For example, an area to the position of a stop line of the road configuration close to the target pedestrian crosswalk can be set as the detection area.

In the above-described embodiments, a configuration is exemplified in which the travel control apparatus 100 includes the database 140, but the travel control apparatus 100 can also be configured to receive the map information from a server provided outside the vehicle. The present invention is not limited to the form in which the travel control apparatus 100 is equipped in a vehicle. In the travel control apparatus 100, for example, the control device 160 or the control device 160 and database 140 may be provided outside the vehicle, and the travel control of the vehicle may be performed by remote control.

In the above-described embodiments, the ambient detection sensor 110 corresponds to the detector of the present invention and the control device 160 corresponds to the controller of the present invention.

DESCRIPTION OF REFERENCE NUMERALS

100 Travel control apparatus
110 Ambient detection sensor
120 Vehicle speed sensor
130 Subject vehicle position detection device
140 Database
150 Drive control device
160 Control device

The invention claimed is:

1. A travel control method for autonomously controlling a vehicle using a controller, comprising:
   specifying a pedestrian crosswalk through which a subject vehicle is expected to pass as a target pedestrian crosswalk;
   detecting a road configuration close to the target pedestrian crosswalk;
   estimating a traffic line of a moving object crossing the target pedestrian crosswalk on a basis of the road configuration;
   setting an area including the estimated traffic line as a detection area of a detector detecting an object around the subject vehicle;
   detecting the moving object in the detection area using the detector;
   calculating a moving distance in which the moving object moves until the subject vehicle reaches the target pedestrian crosswalk, on a basis of a moving speed of the moving object;
   setting a specific area in the area of the estimated traffic line on the road configuration as the detection area, the specific area being an area in which a distance from the target pedestrian crosswalk is the moving distance or less along the traffic line and has a predetermined width; and
   autonomously controlling travel of the subject vehicle with respect to the specific area with the controller.

2. The travel control method for a vehicle according to claim 1, further comprising:
 detecting at least one of a sidewalk, a roadside strip, a pedestrian crosswalk, and a median strip close to the target pedestrian crosswalk as the road configuration.

3. The travel control method for a vehicle according to claim 1, comprising:
 setting an area for the moving object to wait on the road configuration before crossing the target pedestrian crosswalk as a waiting area on a basis of the traffic line in the road configuration; and
 further setting the specific area in the waiting area as the detection area, the specific area being an area in which a distance from the target pedestrian crosswalk is the moving distance or less.

4. The travel control method for a vehicle according to claim 1, wherein when a distance from the subject vehicle to the target pedestrian crosswalk is a predetermined distance or more, the detection area is extended in a width direction of the target pedestrian crosswalk as compared with when the distance from the subject vehicle to the target pedestrian crosswalk is less than the predetermined distance.

5. The travel control method for a vehicle according to claim 1, wherein when a stop line exists before the target pedestrian crosswalk, the specific area includes an area from the target pedestrian crosswalk to the stop line is set as the detection area.

6. The travel control method for a vehicle according to claim 1, wherein, when a guardrail is provided in the road configuration, the specific area in a road area on which the vehicle travels is set as the detection area, wherein the specific area includes an area from the target pedestrian crosswalk to an end part position of the guardrail on the target pedestrian crosswalk side.

7. The travel control method for a vehicle according to claim 1, wherein when a median strip exists between the target pedestrian crosswalk and a pedestrian crosswalk close to the pedestrian crosswalk, the specific area includes an area of the median strip is set as the detection area.

8. The travel control method for a vehicle according to claim 1, further comprising:
 determining whether to set the specific area to include an area of a pedestrian crosswalk close to the target pedestrian crosswalk as the detection area on a basis of a signal indication of a traffic signal.

9. A travel control apparatus comprising:
 a detector configured to detect a surrounding object; and
 a controller configured to autonomously control travel of a subject vehicle on a basis of a detection result of the detector,
 the controller being further configured to:
  specify a pedestrian crosswalk through which the subject vehicle is expected to pass as a target pedestrian crosswalk;
  detect a road configuration close to the target pedestrian crosswalk;
  estimate a traffic line of a moving object crossing the target pedestrian crosswalk on a basis of the road configuration;
  set an area including the estimated traffic line as a detection area of the detector; and
  detect the moving object in the detection area;
  calculate a moving distance in which the moving object moves until the subject vehicle reaches the target pedestrian crosswalk, on a basis of a moving speed of the moving object;
  set a specific area in the area of the estimated traffic line on the road configuration as the detection area, the specific area being an area in which a distance from the target pedestrian crosswalk is the moving distance or less along the traffic line and has a predetermined width; and
  autonomously control travel of the subject vehicle with respect to the specific area.

* * * * *